(12) United States Patent
Puri et al.

(10) Patent No.: US 11,699,444 B1
(45) Date of Patent: Jul. 11, 2023

(54) SPEECH RECOGNITION USING MULTIPLE VOICE-ENABLED DEVICES

(71) Applicant: Amazon Technologies, Inc., Seattle, WA (US)

(72) Inventors: Sahil Puri, Ajax (CA); Zhengran Li, San Jose, CA (US); Zhan Xu, Los Gatos, CA (US); Oliver Sinsik Chiu, Etobicoke (CA); Sembhayya Gollakota, Sunnyvale, CA (US); Bruno Dufour, Mississauga (CA)

(73) Assignee: Amazon Technologies, Inc., Seattle, WA (US)

(*) Notice: Subject to any disclaimer, the term of this patent is extended or adjusted under 35 U.S.C. 154(b) by 279 days.

(21) Appl. No.: 17/078,954

(22) Filed: Oct. 23, 2020

(51) Int. Cl.
| | |
|---|---|
| *G10L 15/22* | (2006.01) |
| *G10L 15/34* | (2013.01) |
| *G06F 40/20* | (2020.01) |
| *G10L 15/30* | (2013.01) |

(52) U.S. Cl.
CPC .............. *G10L 15/34* (2013.01); *G06F 40/20* (2020.01); *G10L 15/22* (2013.01); *G10L 15/30* (2013.01)

(58) Field of Classification Search
CPC ......... G10L 15/22; G10L 15/00; G10L 15/01; G10L 15/08; G10L 15/083; G10L 15/1815; G10L 15/1822; G10L 15/26; G10L 15/28; G10L 15/30; G10L 15/32; G10L 2015/0631–0638; G10L 2015/221–228

USPC ............ 704/270.1, 270, 275, 277, 231, 257
See application file for complete search history.

(56) References Cited

U.S. PATENT DOCUMENTS

| | | | |
|---|---|---|---|
| 2008/0155097 A1* | 6/2008 | Tan ........................ | H04L 67/51 |
| | | | 709/225 |
| 2017/0013331 A1* | 1/2017 | Watanabe ............. | H04L 12/282 |
| 2019/0066670 A1* | 2/2019 | White ..................... | G10L 15/28 |

\* cited by examiner

*Primary Examiner* — Qi Han
(74) *Attorney, Agent, or Firm* — Lee & Hayes, P.C.

(57) ABSTRACT

Techniques for using multiple voice-enabled devices in a user environment to reduce the latency for obtaining responses to user utterances from a remote system. The voice-enabled devices may each establish connections with the remote system to have the remote system perform supplemental speech processing for utterances the devices are unable to process locally. One voice-enabled device may have a higher-latency connection to the remote system, and another voice-enabled device may have a lower-latency connection to the remote system. The lower-latency device may send an utterance to the remote system before the higher-latency device is able, and the remote system may begin processing the utterance faster than if the lower-latency device sent the utterance. The remote system may then provide a response for the utterance to the higher-latency device in less time than if the remote system had to wait for the utterance from the higher-latency device.

20 Claims, 12 Drawing Sheets

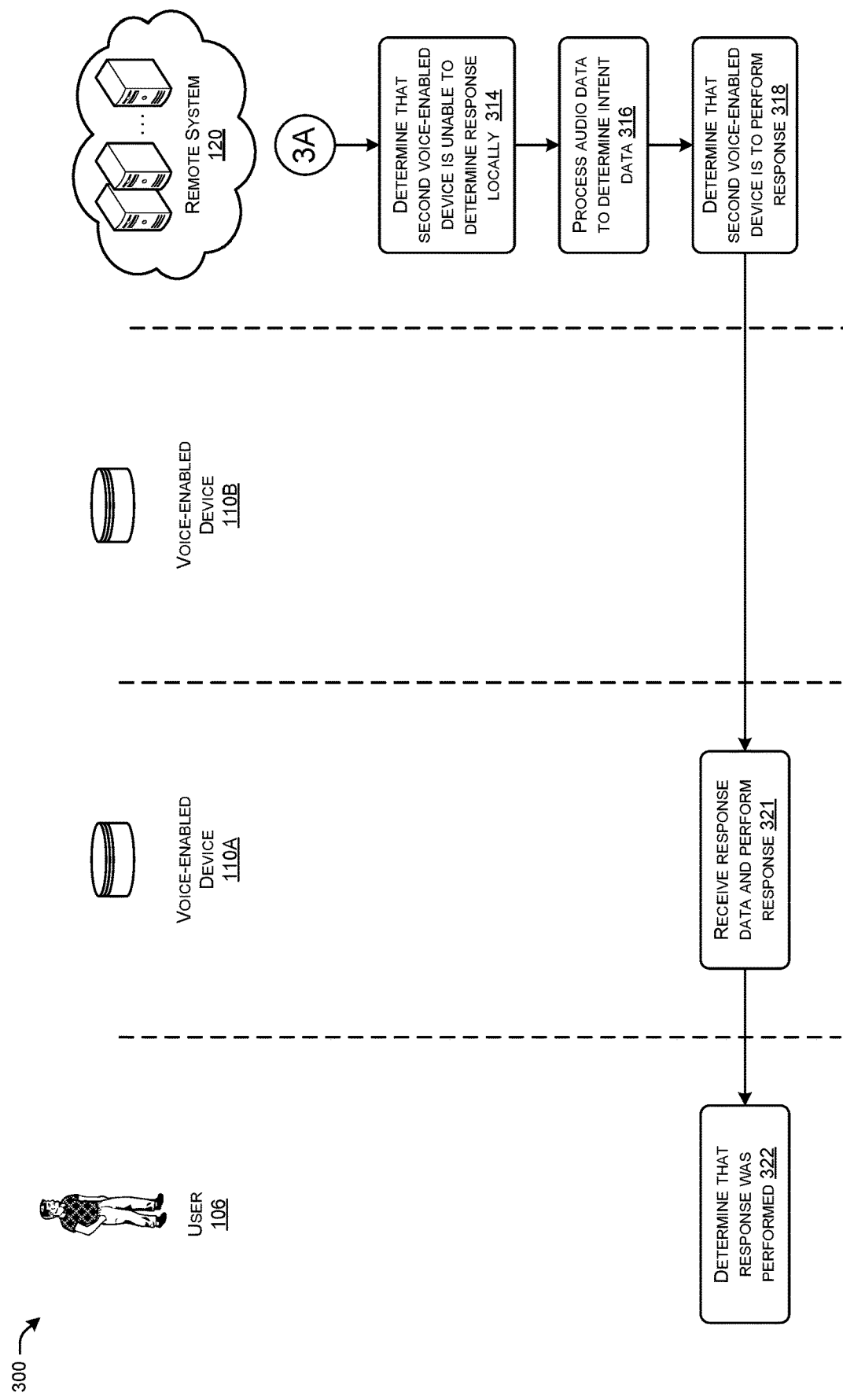

SPEECH RECOGNITION USING MULTIPLE VOICE-ENABLED DEVICES

BACKGROUND

As the capabilities of computing devices continue to evolve, many different ways have been introduced to allow users to interact with computing devices, such as through mechanical devices (e.g., keyboards, mice, etc.) touch screens, motion, and gesture. Many computing devices are now capable of receiving and responding to voice commands, including desktops, tablets, entertainment systems, and portable communication devices. Due to their usefulness, voice-enabled devices continue to proliferate. For instance, voice-enabled devices continue to be used in various environments, such as households, to help with everyday activities.

Homes and other user premises are increasingly equipped with always-on Internet or "cloud" connectivity. The constant, or nearly constant, availability of wide area network communications, in combination with increasing capabilities of computing devices—including hands-free, speech interface devices—have created a number of new possibilities for services that use voice assistant technology with in-home connected devices. For example, various cloud-based services (e.g., music streaming, smart home control, etc.) may be accessible to users through convenient, hands-free interaction with their in-home speech interface devices. However, as voice-enabled devices are introduced into new environments, difficulties often arise when attempting to interface these voice-enabled devices with existing device technology in the environments into which these voice-enabled devices are introduced.

Provided herein are technical solutions to improve and enhance these and other systems.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 3A, 3B, and 3C collectively illustrate an example flow diagram where devices in system communicate with a remote system where a first voice-enabled device is used by the remote system to predict whether or not a second voice-enabled device is able to process an utterance locally.

DETAILED DESCRIPTION

Figure 1:
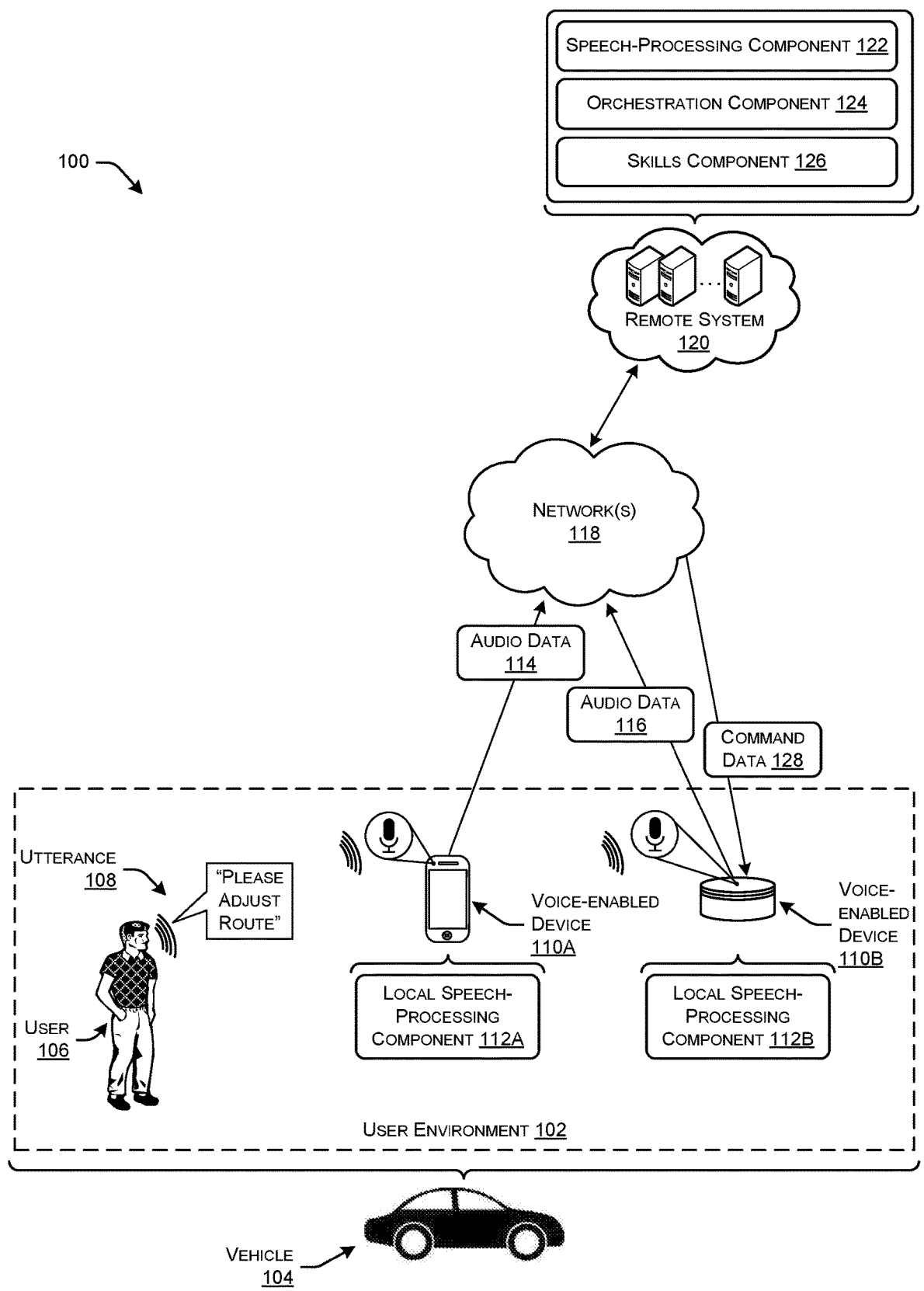
FIG. 1 illustrates a schematic diagram of an example environment in which a first voice-enabled device and a second voice-enabled device each detect and attempt to locally process an utterance. The first voice-enabled device may determine that it is unable to process the utterance locally, and send a request to a remote speech-processing system in order to obtain response data for the utterance. The remote system may then distribute the response data to the second voice-enabled device.

With the proliferation of voice-enabled computing devices, or "voice-enabled devices," users are able to interact with more of their computing devices through speech. For instance, a user may issue a command via a speech (e.g., an "utterance") to a voice-enabled device to perform an operation, such as turning on/off an appliance, streaming music, performing a telephone call, etc. Due to the usefulness of these voice-enabled devices, it is desirable to have voice-enabled devices available for use different environments, particularly in environments in which users traditionally have been unable to interact with computing devices using speech. Voice-enabled devices continue to be implemented in certain environments, such as households, but various issues may arise as voice-enabled devices are introduced and integrated into new environments.

Generally, voice-enabled devices may include one or more microphones and hardware, software, and/or firmware components, to detect and capture utterances from a user. In some examples, voice-enabled devices may be unsophisticated in some respects and have relatively low functionality. For instance, voice-enabled devices may be configured to merely serve as an interface or "middle-man" between a user and a remote system that performs speech processing (e.g., network-based system, network-accessible system, etc.). The voice-enabled devices may receive an utterance of a user after detecting a "wake" trigger (e.g., wake word, button input, etc.) which indicates to the voice-enabled device that a user is issuing a command via an utterance. In response, the devices may proceed to capture subsequent audio data and send it (or a meaningful representation of the audio data) to a speech or other type of natural language processing system (or "remote system") to understand input. The remote system may use natural language processing, spoken language processing, and/or other techniques, to determine response data for responding to the utterance, and send the response data to the voice-enabled device that heard the user. In this way, the more intensive processing involved in processing the utterances may be performed using resources of remote systems, which may, for example, extend battery life performance of battery-powered voice-enabled devices, and also reduce the amount of hardware and/or software included in the voice-enabled devices.

In some examples, voice-enabled devices may be configured with "hybrid" functionality in that the voice-enabled device may be configured to process audio data representing utterances locally to determine response data for responding to the utterances, and also send audio data representing the utterances to the remote system for natural language processing. The voice-enabled device may be configured to determine on its own, and/or be instructed by the remote system, whether to respond to user speech using response data from a remote speech processing system, or response data from a local speech processing component. This hybrid functionality allows voice-enabled devices to respond to utterances of users, even in instances when a remote system—which, when available, can be used for processing user speech remotely—is, for example, unavailable, slower than (with network-related latency factored in), or otherwise less preferred than the voice-enabled devices.

In light of this hybrid functionality voice-enabled devices may be positioned in environments in which connectivity to the remote system has high latency, or is at least periodically unavailable, such as vehicle environments. A user may position voice-enabled devices with hybrid functionality in vehicle environments, such as automobiles, because the voice-enabled devices are able to process utterances locally using a local speech-processing component when the automobile is in a location at which the voice-enabled devices does not have connectivity to the remote system, or has a slow connection (e.g., high latency). While voice-enabled devices with local speech-processing abilities are able to process utterances and respond to users, in some instances, the voice-enabled devices may be limited in the amount of utterances to which they may process, understand, and respond. For instance, there may be practical hardware and/or software constraints for a form factor of voice-enabled devices, and the voice-enabled devices may be unable to process, understand, and respond to the large number of utterances that a voice-enabled devices may receive.

In some instances, a voice-enabled device may include a fallback option (referred to herein as a "fallback skill") where the voice-enabled device determines that it is unable to process an utterance locally, and sends audio data representing the utterance to the remote system for processing. However, in examples where the voice-enabled device is in an environment in which the voice-enabled device has slow connectivity to the remote system, the voice-enabled device may experience slow responses when utilizing the fallback skill to contact the remote system. As an example, an automobile may include a voice-enabled device that is configured to communicate using a particular cellular protocol, such as a third generation (3G) or a fourth generation (4G) of broadband cellular network technologies. However, in various environments through which the automobile may move, the voice-enabled device may have difficulty responding to an utterance of a user, particularly in remote environments where 3G and/or 4G experience high latency (e.g., low bandwidth and/or low signal strength), which may result in a poor user experience.

Users may desire to use voice commands to control various devices in various environments. However, in some instances, the voice-controlled devices may be in environments that are geographically distant from the remote system, have poor signal strength, have low bandwidth availability, and/or has other factors that may result in latency in communications. In such examples, the voice-enabled devices may have slow, or high-latency, connections to the remote system such that the fallback skill of the voice-enabled devices may result in poor user experience, and the voice-enabled devices may be unable to efficiently and effectively perform commands on behalf of users in various remote environments. For instance, by the time the voice-enabled devices are able to communicate with the remote system, the user may no longer want the command performed, or it may otherwise be inappropriate to perform the command.

This disclosure describes techniques for using multiple voice-enabled devices in a user environment to reduce the latency for obtaining responses to user utterances from a remote system. The voice-enabled devices may each establish connections with the remote system to have the remote system perform supplemental speech processing for utterances the devices are unable to process locally. One voice-enabled device may have a higher-latency connection to the remote system where the amount of time taken to obtain a response for an utterance is undesirable. However, another voice-enabled device may have a lower-latency connection to the remote system. The lower-latency device may send an utterance to the remote system before the higher-latency device is able, and the remote system may begin processing the utterance faster than if the lower-latency device sent the utterance. The remote system may then provide a response for the utterance to the higher-latency device in less time than if the remote system had to wait for the utterance from the higher-latency device.

As noted above, a user environment may include multiple voice-enabled devices that are controllable by speech from a user. For instance, a user may be in an automobile, and an in-dash device of the vehicle may be voice-enabled, and a phone of the user may also be voice-enabled. However, one of the voice-enabled devices may be able to establish lower latency connections with the remote system than the other of the voice-enabled device. As an example, the phone may be able to communicate with the remote system using 5G, and the in-dash device of the vehicle may only be able to communicate with 3G and/or 4G. In some instances, the 3G and/or 4G protocols may experience undesirable latency when obtaining responses to utterances from the remote system, which degrades user experience and may frustrate the purpose of the voice-enabled device.

As described herein, a "higher-latency device" is a voice-enabled device that has a connection with a remote system by which communications are slower than a voice-enabled device called the "lower-latency device." The higher-latency device may have more latency for various reasons, such as using a slower communication protocol, communicating with a protocol that is currently experiencing undesirable latency due to signal strength, bandwidth, etc., and/or having software and/or hardware components that are less powerful as compared to the lower-latency device.

As noted above, users may desire to use speech (e.g., utterances, voice commands, etc.) to control their voice-enabled devices and/or other devices. To do so, a user may place a voice-enabled device in their environment. However, with the proliferation of voice-enabled devices, the user may have multiple voice-enabled devices in their environment, such as a higher-latency device and a lower-latency device. The user may then use utterances, or speech, to have the voice-enabled devices perform various operations, such as answering questions, controlling other devices or systems, and so forth. As noted above, each of the higher-latency device and the lower-latency device may receive the utterance and attempt to process the utterance locally. Further, each of the higher-latency device and the lower-latency device may include a fallback skill that is invoked if the devices are unable to determine a response to a command in the utterance. In some examples, the fallback skill is invoked, and the higher-latency device and the lower-latency device may each send a respective request to the remote system to perform supplemental speech processing on the utterance. In some instances, the request may include audio data representing the utterance (e.g., analog signal, digital data, etc.), and in some instances, the request may include text data representing the utterance after the higher-latency device and the lower-latency device performed an automatic-speech-recognition (ASR) technique on the audio data.

However, as noted above, the higher-latency device may experience undesirable latency in sending the request to due, for example, the communication protocol used, the signal strength of the connection, the bandwidth available, software and/or hardware components of the device, and/or other limiting factors associated with communications with the second voice-enabled device in the remote environment. Thus, the request sent from the lower-latency device may reach the remote system before the request sent from the higher-latency device.

The remote system may then receive the request to process the utterance from the lower-latency device. In some instances, the remote system may have previously received indications that the higher-latency device and the lower-latency device are in a same environment (e.g., via a software application, from one of the devices, etc.). Further, the remote system may have received indications that the higher-latency device and the lower-latency device have similar, or the same, local speech-processing components and capabilities. Accordingly, the remote system may determine, or infer, that if the lower-latency device was unable to process the utterance locally, then the higher-latency device is also likely to be unable to process the utterance locally.

The remote system may then process the utterance upon receiving the request from the lower-latency device, and determine intent data representing a response or action for a device to take to the utterance. The remote system may then determine which of the higher-latency device or the lower-latency device is to perform the action that is responsive to the utterance. For instance, the remote system may have received indications of roles that the devices play. In the phone and in-dash device example, the phone may have a role of sending lower-latency requests to the remote system, and the in-dash system may have the role of performing the actions that are responsive to the utterances. The remote system may then send the response to one of the phone or in-dash device for the in-dash device to perform.

In this way, a higher-latency device may receive response data for utterances that it was unable to process locally in shorter periods of time by implementing a lower-latency device in a mirror- or dual-device system. The lower-latency device may mirror the actions of the higher-latency device, but provides the remote system with the result of the local processing of the utterance before the higher-latency device is able. Accordingly, the latency for higher-latency devices to obtain response data from a remote system may be reduced by using lower-latency devices to mirror the actions of the higher-latency devices and provide the remote with a prediction of the processing of the utterance by the higher-latency device.

Thus, the techniques described herein provide various technical advantages for voice-enabled devices. For instance, some voice-enabled devices may experience latency when communicating with the remote system in order to get response data from the remote system. The techniques described herein include the use of a lower-latency device to mimic or mirror the local speech-processing of these higher-latency devices, and notify the remote system as to whether the higher-latency device will need response data from the remote system based on a result of the local processing of an utterance. The lower-latency device may communicate with the remote system with lesser latency than the higher-latency device, and thus, the remote system may have already have predictively begun the process of obtaining response data for the higher-latency device once the higher-latency device provides the indication that it needs the response data.

The techniques described herein are generally applicable to many different technologies and embodiments. For instance, while the technologies are described with respect to an automobile environment and/or a house environment, the techniques are equally applicable to controlling any type of device or vehicle (e.g., a drone, a boat, a cart, a smart grocery cart, an airplane, a satellite, a spacecraft, a helicopter, a train or other public transit, and/or any other type of vehicle or machine).

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram of an example environment in which a first voice-enabled device and a second voice-enabled device each detect and attempt to locally process an utterance. The first voice-enabled device may determine that it is unable to process the utterance locally, and send a request to a remote speech-processing system in order to obtain response data for the utterance. The remote system may then distribute the response data to the second voice-enabled device.

As illustrated, the environment 100 may include a user environment 102, which may be associated with a vehicle 104. Generally, the user environment 102 may include any type of physical location in which a user 106 interacts with various devices, such as voice-enabled devices 110, using utterances 112. As shown, the user 106 would like to control the vehicle 104 by issuing an utterance 108 including a command. The user may speak a natural language, utterance

108, such as "please adjust route" that is meant as a command to be performed in association with adjusting a route of the vehicle 104.

As illustrated, the user environment 102 may include a first voice-enabled device 110A (referred to herein as lower-latency device 110A), and a second voice-enabled device 110B (referred to herein as higher-latency device 110B). Generally, the voice-enabled devices 110A and 110B may be designed to operate from a fixed location, and in other embodiments, the voice-enabled devices 110A and 110B may be portable or mobile. For instance, the voice-enabled devices 110A and 110B may comprise handheld devices or other mobile devices, such as smartphones, tablet computers, media players, personal computers, wearable devices, various types of accessories, and so forth. As described herein the higher-latency device 110B may be a voice-enabled device that has a connection with a remote system 120 by which communications are slower than the lower-latency device 110A. The higher-latency device 112B may have more latency for various reasons, such as using a slower communication protocol, communicating with a protocol that is currently experiencing undesirable latency due to signal strength, bandwidth, etc., and/or having software and/or hardware components that are less powerful as compared to the lower-latency device 110A.

As described above, the lower-latency device 110A and higher-latency device 110B may receive or capture sound corresponding to the utterance 108 of the user 106 via one or more microphones. In certain implementations, the utterance 108 may include or be preceded by a wakeword or other trigger expression or event that is spoken by the user 106 to indicate that subsequent user speech is intended to be received and acted upon by the lower-latency device 110A and higher-latency device 110B and/or a remote system. In some instances, the lower-latency device 110A and higher-latency device 110B may operate in a low-functionality mode and analyze sound using ASR processing. When the wakeword is detected using ASR, the lower-latency device 110A and higher-latency device 110B may process the user speech locally using respective local speech-processing components 112A and 122B. That is, audio signals generated using local microphones of the lower-latency device 110A and higher-latency device 110B may be converted into audio data 114/116 that represents the utterance 108 and input into the local speech-processing components 112 of each of the lower-latency device 110A and higher-latency device 110B.

As described in more detail below with respect to FIGS. 4A and 4B, the local-speech-processing components 112 may generally perform techniques for determining an intent of the utterances 112 issued by users 106, and those intents are then mapped into commands, actions, and/or operations for devices to perform that are responsive to the commands included in the utterances 112. In some instances, the local-speech-processing components 112 may map intents to different applications, referred to herein as skills. "Skills," as described herein may be applications and/or may be a subset of an application. For example, a skill may receive data representing an intent. For example, an intent may be determined by the local-speech-processing components 112 and/or as determined from user input via a computing device. Skills may be configured to utilize the intent to output data for input to a text-to-speech component, a link or other resource locator for audio data, and/or a command to a device, such as the lower-latency device 110A and higher-latency device 110B. as an example, a "music skill" may be configured to utilize intent to determine commands for a device to perform relative to music. As an example, an utterance 108 of "please stop" may map to command for a voice-enabled device to stop a song from playing. In another example, the same utterance of "please stop" may map to the break of the vehicle 104 being compressed. Thus, different skills may be applicable for different domains and/or capabilities based on a context around the voice-enabled devices and/or the utterance 108.

Thus, the lower-latency device 110A and higher-latency device 110B include local speech-processing components 112, and the lower-latency device 110A and higher-latency device 110B may process utterances 112 and respond to users 106. However, the lower-latency device 110A and higher-latency device 110B may, in some instances, be limited in the amount of utterances 112 to which they may process, understand, and respond. For instance, there may be practical hardware and/or software constraints for a form factor of the lower-latency device 110A and higher-latency device 110B, and the lower-latency device 110A and higher-latency device 110B may be unable to process, understand, and respond to the large number of utterances 112 that a lower-latency device 110A and higher-latency device 110B s may receive.

Accordingly, the lower-latency device 110A and higher-latency device 110B may include a fallback option (referred to herein as a "fallback skill") where the lower-latency device 110A and higher-latency device 110B determine that they are unable to process an utterance 108 locally, and send audio data 114/116 representing the utterance 108 to be further processed by the remote system 120 to determine response data (e.g., command data 128) indicating a response to the utterance 108. However, in examples where the higher-latency device 110B is in the remote environment 106 in which the higher-latency device 110B is unable to connect to the remote system 120, the higher-latency device 110B may be unable utilize the fallback skill to contact the remote system. In such examples, the higher-latency device 110B may be unable to respond to the utterance 108 of the user 106, which may result in a poor user experience.

Thus, the lower-latency device 110A and higher-latency device 110B may each detect the utterance 108 output by the user 106, attempt to process the utterance 108 locally using respective local speech-processing components 112, and may each utilize the fallback skill that is invoked due to the lower-latency device 110A and higher-latency device 110B being unable to determine a response to a command in the utterance 108. Generally, the lower-latency device 110A and higher-latency device 110B may include the same, or similar, hardware and software components such that if the lower-latency device 110A is unable to process an utterance 108, then the higher-latency device 110B is also unable to process the utterance 108.

Accordingly, the lower-latency device 110A may be used to process utterances 112 to determine, or predict, whether or not the higher-latency device 110B will be able to process the utterances 112 locally, or have to use the fallback skill. In examples where the lower-latency device 110A determines that it is unable to process the utterance 108 to determine response data for responding to a command in the utterance 108, the lower-latency device 110A may use the fallback skill and provide the remote system 120 with an indication that it was unable to process the utterance 108 locally. Additionally, because the lower-latency device 110A has less latency when communicating with the remote system 120 than the higher-latency device 110B, the lower-latency device 110A may provide this indication to the remote system 120 prior to the higher-latency device 110B providing indication. Thus, the devices 110A and 110B may each begin the process of sending the audio data, at different latencies, representing the utterance 108 to the remote system 120 over one or more networks 118 for the remote system 120 to process and determine response data for the utterance 108.

As shown in FIG. 1, the remote system 120 may generally refer to a network-accessible platform—or "cloud-based service"—implemented as a computing infrastructure of processors, storage, software, data access, and so forth that is maintained and accessible via the network(s) 118, such as the Internet and/or a cellular network. The remote system 120 may be implemented as one or more computing devices including one or more servers, desktop computers, laptop computers, or the like. In one example, the remote system 120 is configured in a server cluster, server farm, data center, mainframe, cloud computing environment, or a combination thereof. To illustrate, the remote system 120 may include any number of devices that operate as a distributed computing resource (e.g., cloud computing, hosted computing, etc.) that provides services, such as storage, computing, networking, and so on. Thus, the remote system 120 is generally implemented as network-accessible resources. These resources comprise one or more processors and computer-readable storage media executable on the processors. The computer-readable media may store various components, such as a speech-processing component 122, an orchestration component 124, and a skills component 126.

In response to receiving the audio signal/data representing the utterance 108, the speech-processing component 122 may begin performing speech-processing techniques on the audio data. For example, the orchestration component 124 of the remote system 120 may call an automated speech recognition (ASR) component of the speech-processing component 122 to process the audio data using automated speech recognition to generate text data representing the utterance from which one or more user voice commands may be identified. Further, the orchestration component 124 may call a natural language understanding (NLU) component of the speech-processing component 122 to process the text data representing the utterance 108 using natural language understanding to determine an intent (e.g., intent data) expressed by the user 106 in the utterance 108. For example, if the user 106 issued a command to "Please adjust route," the NLU component may determine that the user's intent is to have a route of the vehicle 104 changed.

Once the speech-processing component 122 has identified the intent of the utterance 108 of the user 106, the orchestration component 124 may provide an indication of the intent to the skills component 126. The skills component 126 may use the intent to determine a response for the processed utterance 108. For instance, the skills component 126 may work in conjunction with one or more speechlets that are configured to determine a response for the processed utterance 108, determine locations of relevant information for servicing a request from the user (e.g., network-based addresses at which the requested music audio data is stored), and/or generate and store the information if it is not already created, as well as route the identified intents to the appropriate destination skill interface. The destination skill interface may be determined based on the intent determined using the NLU. For example, if the NLU output includes a command to change a route (vehicle control intent), the destination skill interface may be a vehicle control application configured to execute a vehicle-control command.

After determining the response data for responding to the utterance 108 (e.g., a command, text-to-speech (TTS) response, etc.), the remote system 120 may send the response data to at least the higher-latency device 110B, and may also send the response data to the lower-latency device 110A in some examples. The higher-latency device 110B may then perform the response indicating in the response data, which may include outputting a TTS response using a loudspeaker, cause the vehicle 104 to perform an operation, cause another device in the environment 102 to perform an operation, and/or any other response/action/operation.

The various devices described herein may comprise any type of computing device (e.g., telephone device, tablet device, laptop computing device, mobile device, server, data center, etc.) configured to send and receive data. In some examples, the devices may be configured to send and receive data over various types of networks. For instance, the intercoms devices may be configured to send and receive data over wireless wide area networks (WWANs), such as 3G networks, 4G networks, 4G LTE networks, and so forth. While illustrated as being a WAN network 118, the network 118 may alternatively be any other type of network configured to send and receive data between computing devices, such as Personal Area Networks (PANs), Local Area Networks (LANs), Campus Area Networks (CANs), Metropolitan Area Networks (MANs), Broadband Global Area Networks (BGANs), extranets, intranets, the Internet, short-range wireless communication networks (e.g., ZigBee, Bluetooth, etc.) Wide Area Networks (WANs)— both centralized and/or distributed—and/or any combination, permutation, and/or aggregation thereof. In some examples, the devices may send data over the WAN network 118 using one or more network relay points (e.g., cellular network towers) depending on the distance over which the data must travel. The WAN network 118 may represent an array of wired networks, wireless networks (e.g., WiFi), or combinations thereof. Generally, the higher-latency device 110B and the lower-latency device 110A may be configured to establish any type of connection with the remote system 120.

Figure 2A:
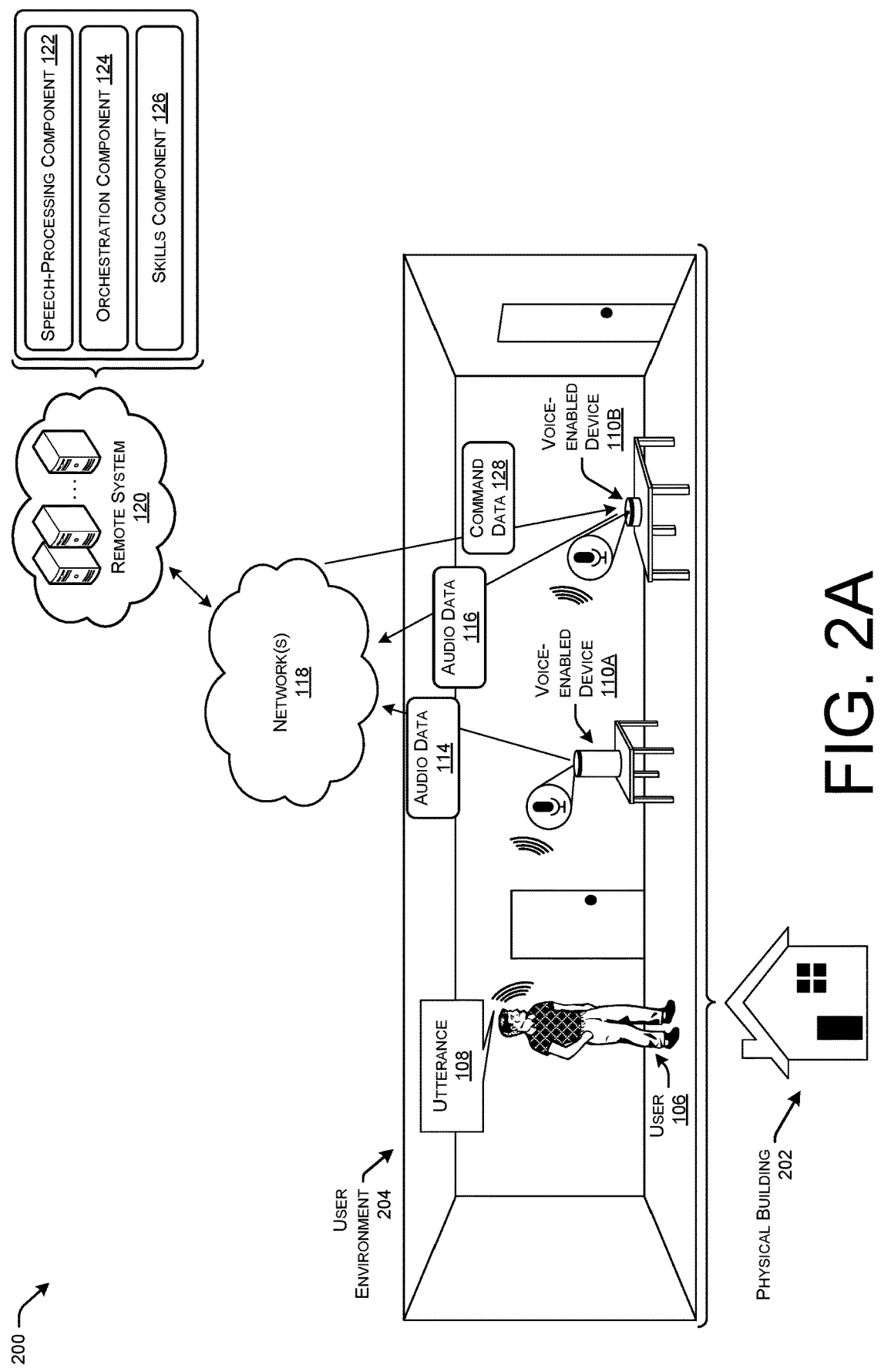
FIG. 2A illustrates a schematic diagram of another example environment in which a first voice-enabled device and a second voice-enabled device each detect and attempt to locally process an utterance. The first voice-enabled device may determine that it is unable to process the utterance locally, and send a request to a remote speech-processing system in order to obtain response data for the utterance. The remote system may then distribute the response data to the second voice-enabled device. In the illustrative example, the example environment may be a house location.

FIG. 2A illustrates a schematic diagram of another example environment in which a first voice-enabled device and a second voice-enabled device each detect and attempt to locally process an utterance. The first voice-enabled device may determine that it is unable to process the utterance locally, and send a request to a remote speech-processing system in order to obtain response data for the utterance. The remote system may then distribute the response data to the second voice-enabled device. In the illustrative example, the example environment may be a house location.

FIG. 2A illustrates that the techniques may be implemented in various environments, such as an environment 200 that includes a physical building 202. As illustrated, the user 106 may be located in a local environment 202 with the lower-latency device 110A. Further, the techniques described with reference to FIG. 1 are equally applicable to the environment 200 of FIG. 2A.

That is, each of the lower-latency device 110A and the higher-latency device 110B may detect the utterance 108 emitted by the user 106 in the user environment 204. However, in this case the user environment 204 is associated with a physical building 202, such as a house. The lower-latency device 110A and the higher-latency device 110B may each determine that they are unable to determine a response to the utterance 108 on their own, or locally. The lower-latency device 110A and the higher-latency device 110B may then each send out requests to the remote system 120 via their respective connections. However, the lower-latency device 110A may send the request at a lower latency, or faster, than the higher-latency device 110B sends a request. Thus, the remote system 120 may begin processing the utterance provided by the lower-latency device 110A, and infer that the higher-latency device 110B was also unable to process the utterance 108 locally. The remote system 120 may then determine a response for the utterance 108, and sent the response directly to the higher-latency device 110B, or to the lower-latency device 110A which may then relay the response to the higher-latency device 110B. The higher-latency device 110B may then perform the response or command determined by the remote system 120.

In some examples, the voice-enabled device 110A may act as a hub, edge server, etc., to communicate with the remote system 120 on behalf of the voice-enabled device 110B. For instance, the voice-enabled device 110A may have additional, or more robust, processing capabilities as compared to the voice-enabled device 110B. For instance, the voice-enabled device 110A may be a hub or edge server that has additional hardware and/or software components, and/or more complex hardware and/or software components, as compared to the voice-enabled device 110B. In some instance, the voice-enabled device 110B may attempt to process the utterance 108 locally, and if it is unable to do so, the voice-enabled device 110B may reach out to the voice-enabled device 110A to determine if the voice-enabled device 110A is able to process the utterance 108. If the voice-enabled device 110A is unable to process the utterance using the more robust hardware and/or software components for processing utterances, the voice-enabled device 110A may send a request to the remote system 120 to process the utterance 108. The remote system 120 may then process the utterance 108 (audio data, text data, etc.), and return response data to the voice-enabled device 110A and/or the voice-enabled device 110B. In some examples, the voice-enabled device 110A uplink may be faster than an uplink of the voice-enabled device 110B. However, the downlink from the remote system 120 may be to the voice-enabled device 110B, which is different than the uplink route from the voice-enabled device 110A.

In examples where the voice-enabled device 110A acts as an edge server and/or hub, the voice-enabled device 110A may not even include microphones, but may simply be accessible by voice-enabled devices in the user environments 102/204 and simply have more complex speech-processing functionality as compared to the voice-enabled devices in order to alleviate reliance on the remote system 120.

Figure 2B:
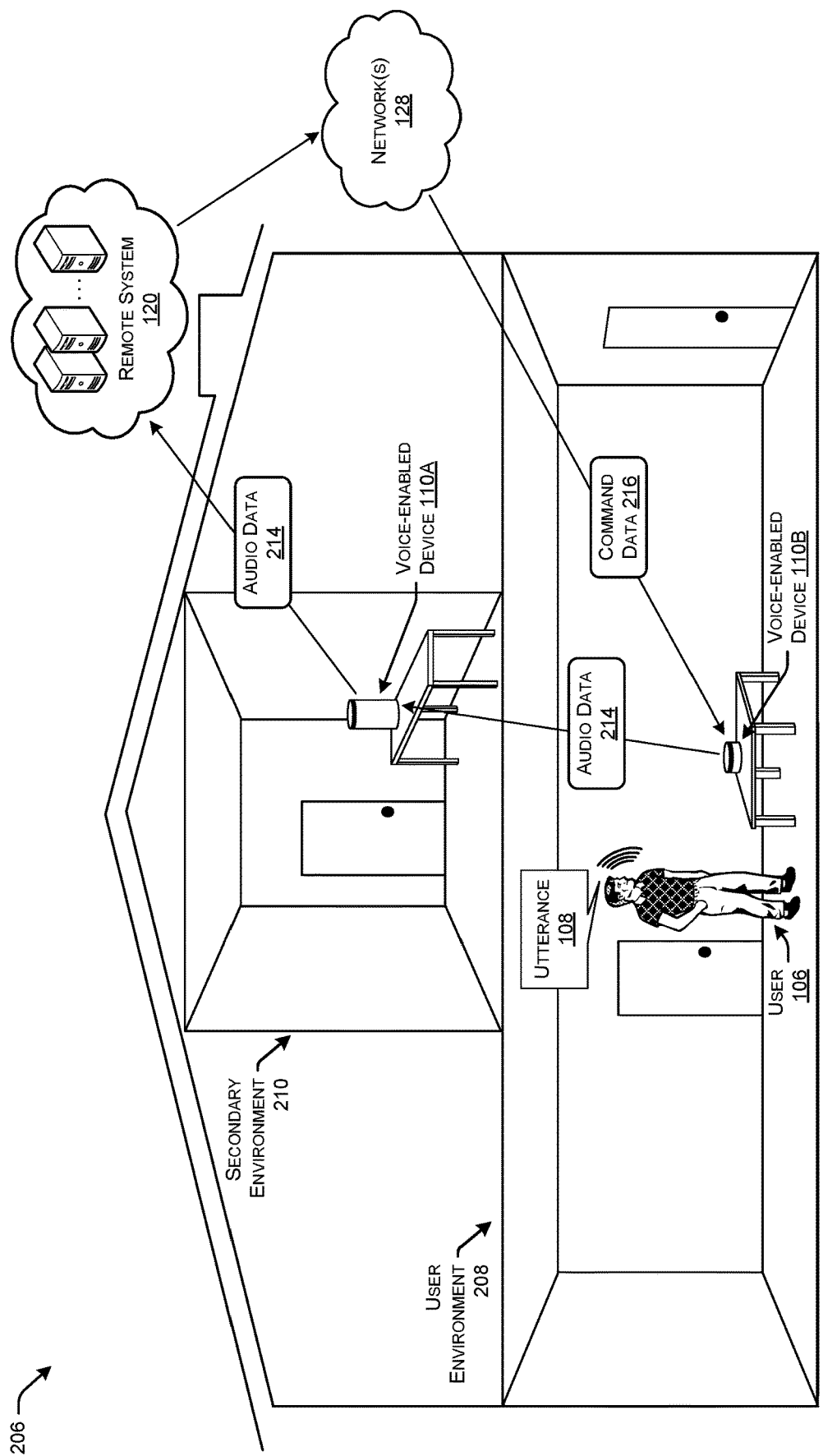
FIG. 2B illustrates a schematic diagram of an example environment in which a voice-enabled device detects and attempts to locally process an utterance. The voice-enabled device may then request that an edge device process the utterance on its behalf in order to obtain response data for the utterance.

FIG. 2B illustrates a schematic diagram of an example environment 206 in which a voice-enabled device detects and attempts to locally process an utterance. The voice-enabled device may then request that an edge device process the utterance on its behalf in order to obtain response data for the utterance.

As illustrated, a voice-enabled device 110B may detect the utterance 108 emitted by the user 106 in the user environment 208. However, in this case the user environment 208 is associated with a physical building, such as a house environment 206, that further includes a secondary environment 210. The secondary environment 210 may include the other voice-enabled device 110A. The voice-enabled device 110B may determine that it is unable to determine a response to the utterance 108 on its own, or locally. The voice-enabled device 110B may be configured to send a request to the second voice-enabled device 110A to process the utterance 108, where the request may include audio data 214. In some instances, the voice-enabled device 110B may have no uplink connection to the remote system 120, or a high-latency uplink connection to the remote system 120.

In some examples, the voice-enabled device 110A may act as a hub, edge server, etc., to communicate with the remote system 120 on behalf of the voice-enabled device 110B. For instance, the voice-enabled device 110A may have additional, or more robust, processing capabilities as compared to the voice-enabled device 110B. For instance, the voice-enabled device 110A may be a hub or edge server that has additional hardware and/or software components, and/or more complex hardware and/or software components, as compared to the voice-enabled device 110B. Thus, in some examples, the voice-enabled device 110B may stream audio data 214 (and/or text data) representing the utterance 108 to the voice-enabled device 110A.

In some instances, the voice-enabled device 110B may attempt to process the utterance 108 locally. If the voice-enabled device 110B is able to process the utterance 108 locally, the voice-enabled device 110B may perform the response or command determined for the utterance 108 locally and respond to the user 106. However, if the voice-enabled device 110B is unable to do so, the voice-enabled device 110B may reach out to the voice-enabled device 110A to determine if the voice-enabled device 110A is able to process the utterance 108. If the voice-enabled device 110A is unable to process the utterance using the more robust hardware and/or software components for processing utterances, the voice-enabled device 110A may send a request including the audio data 214 to the remote system 120 to process the utterance 108. The remote system 120 may then process the utterance 108 (audio data, text data, etc.), and return command data 216 (e.g., response data) to the voice-enabled device 110A and/or the voice-enabled device 110B. In some examples, the voice-enabled device 110A uplink may be faster than an uplink of the voice-enabled device 110B. However, the downlink from the remote system 120 may be to the voice-enabled device 110B, which is different than the uplink route from the voice-enabled device 110A.

In examples where the voice-enabled device 110A acts as an edge server and/or hub, the voice-enabled device 110A may not even include microphones, but may simply be accessible by voice-enabled devices in the user environments 102/204 and simply have more complex speech-processing functionality as compared to the voice-enabled devices in order to alleviate reliance on the remote system 120.

Figure 3A:
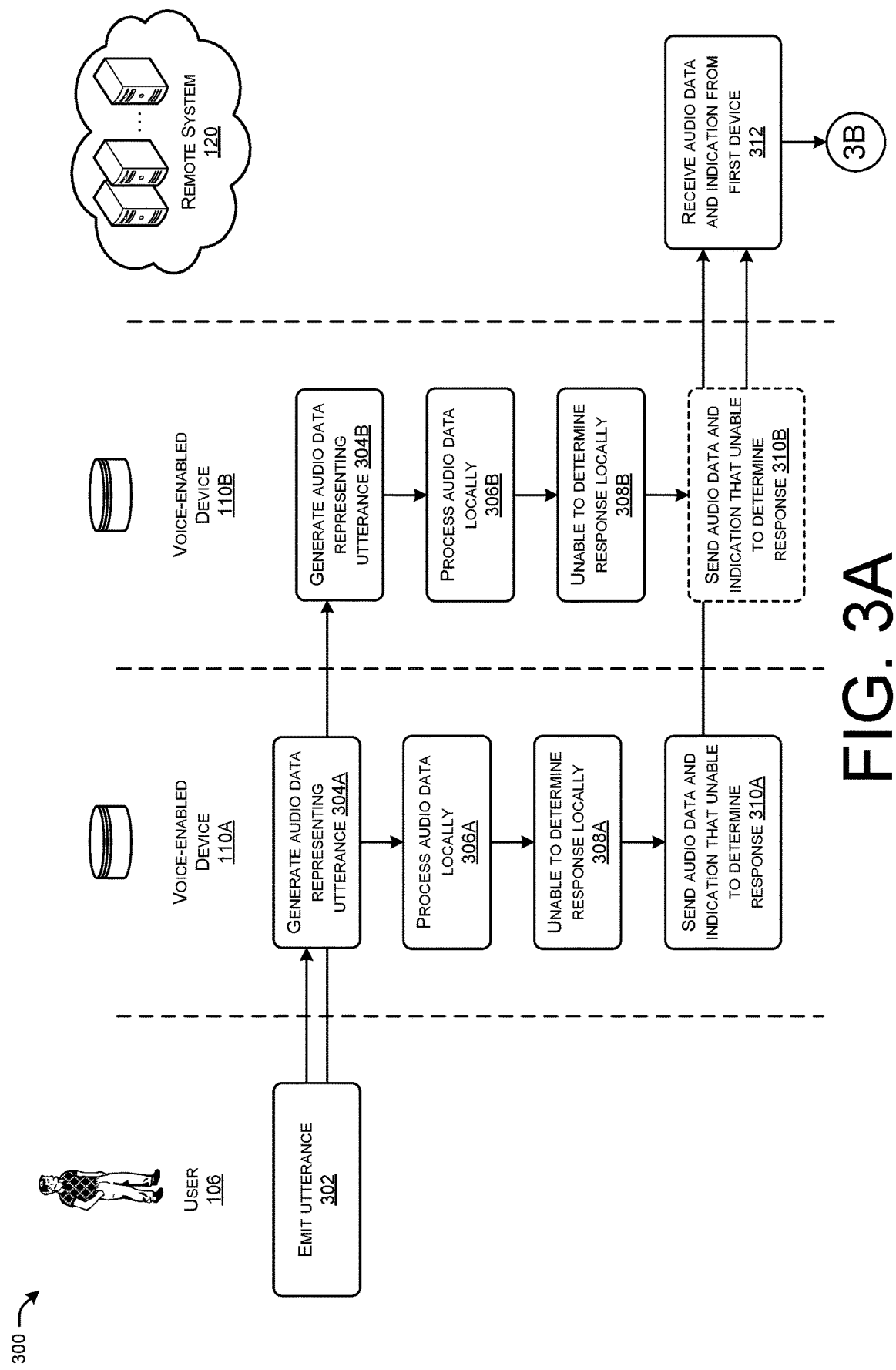
Figure 3B:
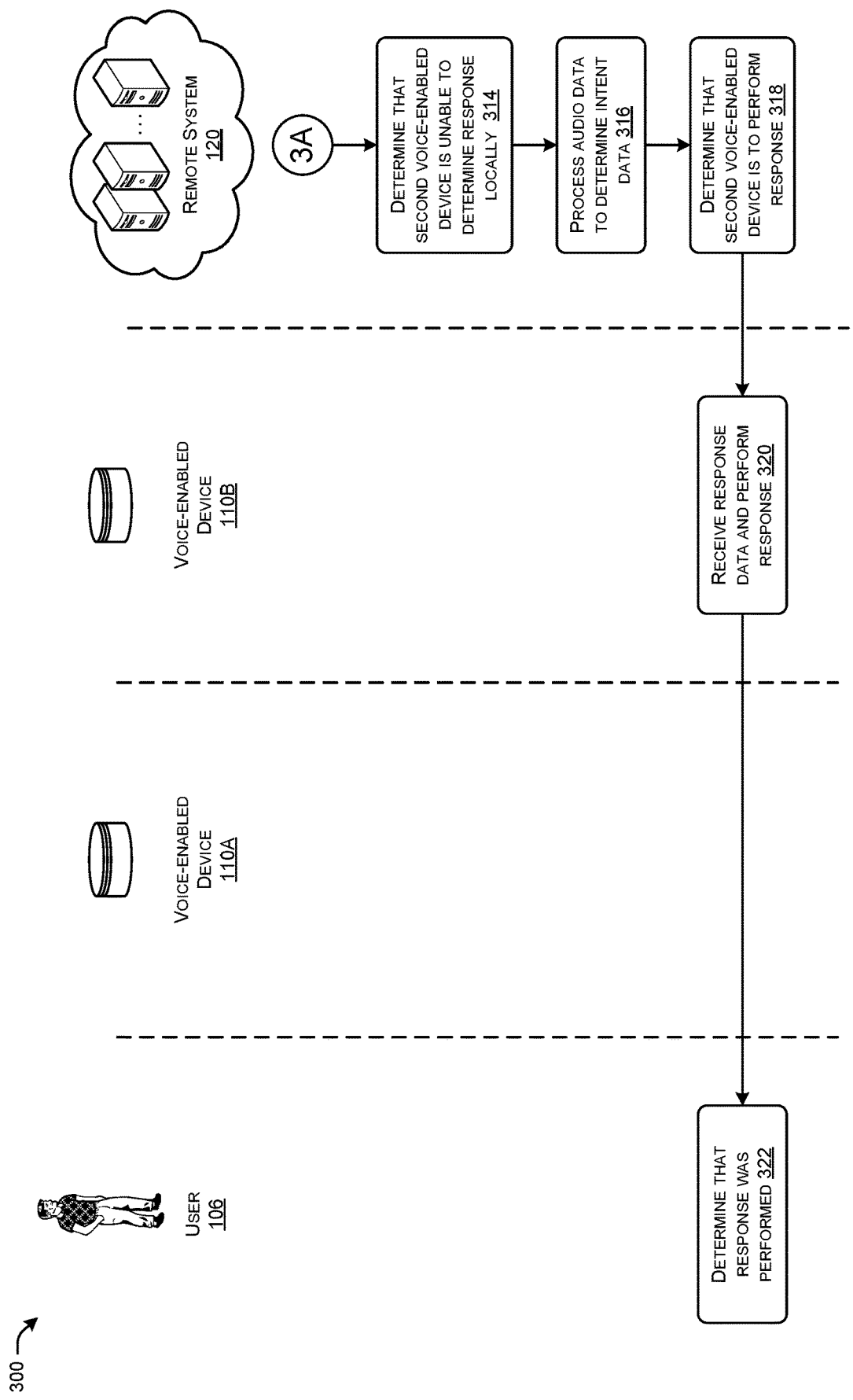

FIGS. 3A, 3B, and 3C collectively illustrate an example flow diagram where devices in system communicate with a remote system where a first voice-enabled device is used by the remote system to predict whether or not a second voice-enabled device is able to process an utterance locally.

At 302, a user 106 may emit an utterance 108. The utterance 108 may include a command for an operation or action to be performed by a device. At 304A and 304B, the lower-latency device 110A and the higher-latency device 110B may each generate audio signals and/or audio data representing the utterance 108 that they detected as being emitted by the user 106. However, in some examples, the voice-enabled device 110B may receive or detect the utterance 108, and generate the audio data representing the utterance 108 at 304B. In such an example, the device 110A may not perform 304A. For instance, the device 110B may be headphones that are configured to detect and capture utterance 108 from users 106, and the headphones may be configured to send audio data representing the utterances 108 to the voice-enabled device 110A, such as a phone. The device 110A may then attempt to process the utterance 108 locally on behalf of the headphone device 110B. In such examples, 306B, 308B, and 310B may be optional and/or not occur because device 110A takes over processing of the utterance 108 on behalf of the device 110B.

At 306A and 306B, each of the lower-latency device 110A and the higher-latency device 110B may attempt to process the audio data locally to determine intent data and/or a response to the utterance. At 308A and 308B, each of the lower-latency device 110A and the higher-latency device 110B may determine that they are unable to determine the response locally. In such examples, each of the lower-latency device 110A and the higher-latency device 110B may invoke a fallback skill in order to have the remote system 120 determine the response.

As shown in FIG. 2B, in some instances, the lower-latency device 110A may not even generate audio data representing the utterance 108 from the user 106. That is, only the higher-latency device 110B may detect the utterance and perform steps 304B (e.g., the lower-latency device 110A does not perform 304A). In such examples, step 306A may only occur after steps 306A, 306B, and 308B. The lower-latency device 110A may receive the audio data from the higher-latency device 110B after 308B, and then the lower-latency device 110A may perform steps 306A, 306A, 308A, and 310A. In such examples, the step 310B may not occur, and only 310A may occur.

At 310A, the lower-latency device 110A may send audio data and/or an indication to the remote system 120 that it was unable to determine the response, and at 310B, the higher-latency device 110B may optionally send audio data and/or an indication that it was unable to determine the response. That is, each of the higher-latency device 110B and the lower-latency device 110A may invoke the fallback skill because they are unable to determine a response to a command in the utterance. In some examples, the fallback skill is invoked, and the higher-latency device 110B and the lower-latency device 110A may each send a respective request to the remote system 120 to perform supplemental speech processing on the utterance. In some instances, the request may include audio data representing the utterance (e.g., analog signal, digital data, etc.), and in some instances, the request may include text data representing the utterance after the higher-latency device and the lower-latency device performed an automatic-speech-recognition (ASR) technique on the audio data.

At 312, the remote system 120 may receive the audio data and indication from the lower-latency device 110A, and at 314, the remote system 120 may determine that the higher-latency device 110B was unable to process the utterance 108. That is, if the lower-latency device 110A has to utilize the fallback skill because it is unable to determine a response to the utterance 108 locally, the remote system 120 determines, infers, predicts, etc., that the higher-latency device 110B is also unable to process the utterance 108 locally to determine the response.

At 316, the remote system 120 may process the audio data (and/or text data) to determine response data indicating a response to the utterance 108. Additional description of this processing may be found with respect to FIG. 5.

At 318, the remote system 120 may store the response data in a cache for the most recent responses, and may send the response data to the higher-latency device 110B, and may additionally send the response data to the lower-latency device 110A. At 320, at least the higher-latency device 110B may receive the response data and perform the response as appropriate. At 322, the user 106 may determine that the response was performed by the higher-latency device 110B.

During the process, the remote system 120 may then determine which of the higher-latency device 110B or the lower-latency device 110A is to perform the action that is responsive to the utterance. For instance, the remote system 120 may have received indications of roles that the devices play. In the phone and in-dash device example, the phone may have a role of sending lower-latency requests to the remote system 120, and the in-dash system may have the role of performing the actions that are responsive to the utterances. The remote system 120 may then send the response to one of the phone or in-dash device for the in-dash device to perform.

Optionally, the method 300 may, rather than proceeding to 316 in FIG. 3B, may instead proceed to 316 in FIG. 3C. In such examples, the remote system 120 may, at 314, may determine that the higher-latency device 110B was unable to process the utterance 108. That is, if the lower-latency device 110A has to utilize the fallback skill because it is unable to determine a response to the utterance 108 locally, the remote system 120 determines, infers, predicts, etc., that the higher-latency device 110B is also unable to process the utterance 108 locally to determine the response.

At 316, the remote system 120 may process the audio data (and/or text data) to determine response data indicating a response to the utterance 108. Additional description of this processing may be found with respect to FIG. 5.

At 318, the remote system 120 may store the response data in a cache for the most recent responses, and may send the response data to the higher-latency device 110B, and may additionally send the response data to the lower-latency device 110A. At 321, the lower-latency device 110A may receive the response data and perform the response as appropriate. At 322, the user 106 may determine that the response was performed by the lower-latency device 110A.

In an illustrative example, the voice-enabled device 110B may send the audio data, text data, and/or other input data to the remote system 120 (e.g., the uplink) at 310B. However, the voice-enabled device 110B may not be included in the downlink from the remote system 120, as shown in FIG. 3C where the voice-enabled device 110A may receive response data at 321 from the remote system 120 and perform the response.

In an illustrative example, the voice-enabled device 110B may send the audio data, text data, and/or other input data to the remote system 120 (e.g., the uplink) at 310B. However, the voice-enabled device 110B may not be included in the downlink from the remote system 120, as shown in FIG. 3C where the voice-enabled device 110A may receive response data at 320B from the remote system 120 and perform the response.

Figure 4A:
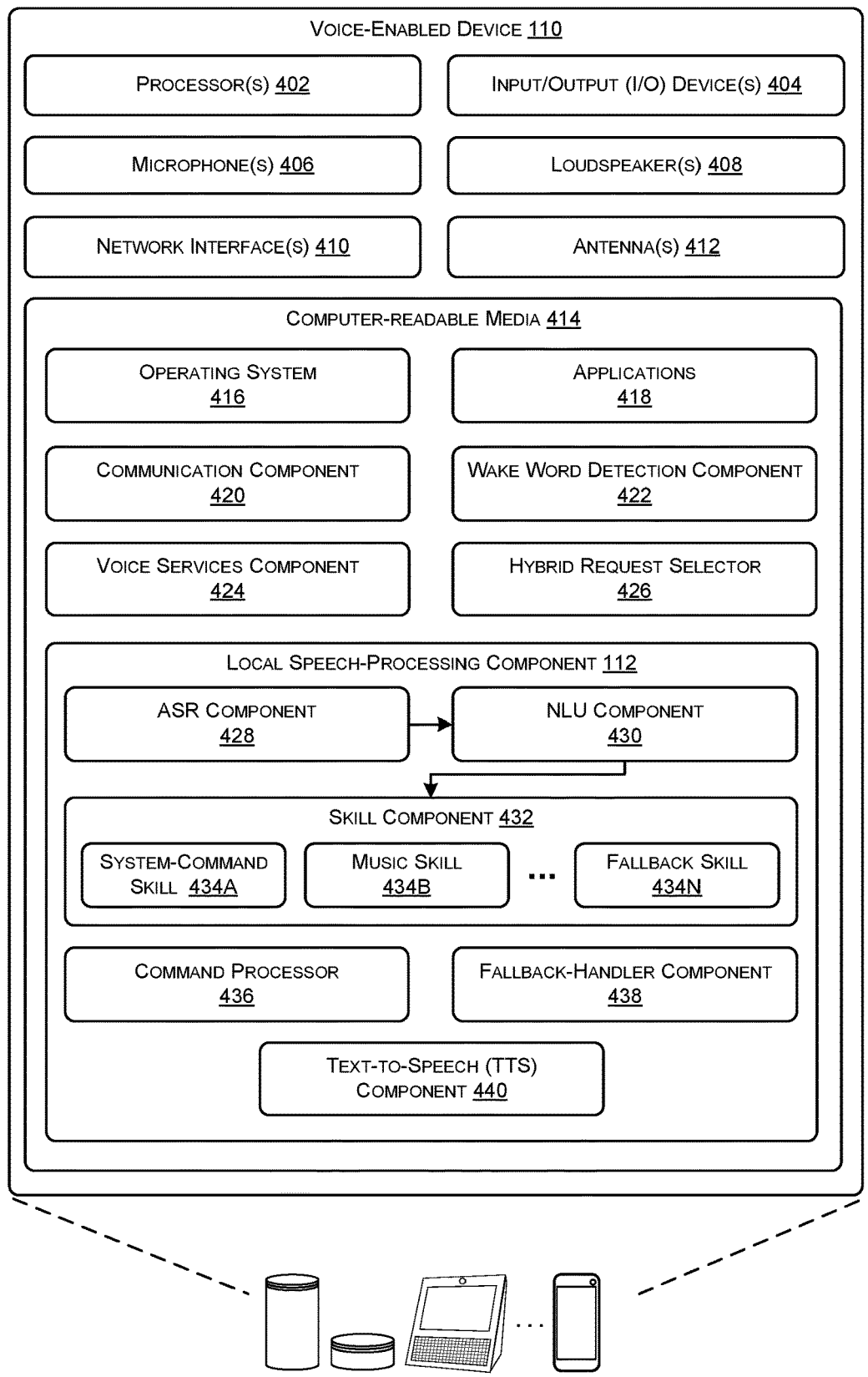
FIGS. 4A and 4B collectively illustrate a block diagram of an example architecture of a voice-enabled device which detects utterances, generates audio data representing the utterances, and attempts to process the utterance locally using a speech-recognition component.
Figure 4B:
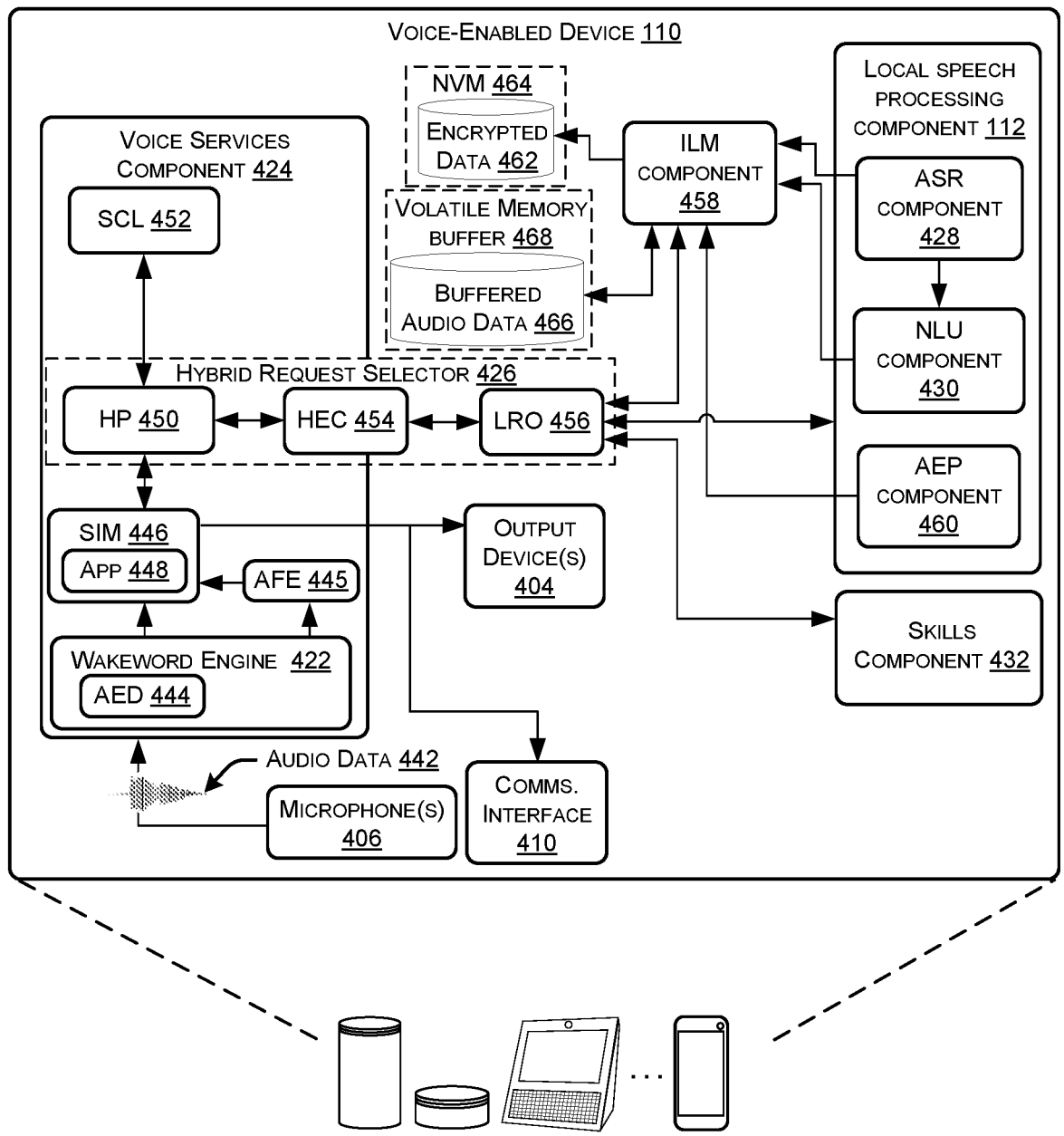

FIGS. 4A and 4B illustrate block diagrams of an example architecture of a voice-enabled device 110 which detects utterances, generates audio data representing the utterances, and attempts to process the utterance locally using a speech-recognition component. In some instances, the voice-enabled device 110 may be to the first voice-enabled device 110A and/or the second voice-enabled device 110B.

In the illustrated implementation, the voice-enabled device 110 includes one or more processors 402. The one or more processors 402 may process data and power the various hardware, software, and firmware components of the voice-enabled device 110. The voice-enabled device 110 may further include various hardware components. The voice-enabled device 110 may include or be associated with various input/output devices 404, such as displays, keyboards, navigation buttons, touch screens, LEDs, a mouse, haptic sensors, joysticks, and so forth, for receiving input from a user 106, and also for outputting information or data to a user 110. Additionally, the voice-enabled device 110 may include one or more microphones 406 which may include sensors (e.g., transducers) configured to receive sound. The microphones 406 generate input signals for audio input (e.g., sound). For example, the microphones 406 may determine digital input signals for an utterance 108 of the user 106. The voice-enabled device 110 may further include one or more loudspeakers 408 to output audio sounds represented by audio data. In some examples, the loudspeakers 408 may be used in conjunction with the microphones 406 to facilitate a conversation with a user 106. For instance, the voice-enabled device 110 may stream audio data representing utterances of the user 106 to the remote system 120, and receive TTS response audio data to output using the speakers 408 to facilitate a dialog with the user 106.

The voice-enabled device 110 may further include a power source (not illustrated), such as a power cord and/or a battery source, for powering the components of the voice-enabled device 110. The voice-enabled device 110 may include a universal asynchronous receiver-transmitter (UART) to provide an interface for various communications, such as a debugging interface. Additionally, the voice-enabled device 110 may have one or more network interfaces 410 such as a wireless or Wi-Fi network communications interface, an Ethernet communications interface, a cellular network communications interface, a Bluetooth communications interface, etc., for communications with the voice-enabled device 110 over various types of networks, including local-area networks, private networks, public networks etc. In the case of a wireless communications interfaces, such interfaces may include radio transceivers and associated control circuits and logic for implementing appropriate communication protocols. The network interfaces 410 may utilize one or more antennas 412 of the voice-enabled device 110 to send and receive signals over various networks.

The voice-enabled device 110 may further include computer-readable media 414 that stores various executable components, including an operating system 416 that is configured to manage hardware and services within and coupled to the voice-enabled device 110 for the benefit of other modules. In addition, the computer-readable media 414 may store one or more applications 418 that a user 106 may interact with by issuing voice commands to the voice-enabled device 110, such as a music player, a movie player, a timer, a calendar, and a personal shopper. However, the voice-enabled device 110 may include any number or type of applications and is not limited to the specific examples shown here. The music player may be configured to play songs or other audio files. The movie player may be configured to play movies or other audio/visual media. The timer may be configured to provide the functions of a simple timing device and clock. The personal shopper may be configured to assist a user 106 in purchasing items from web-based merchants.

The computer-readable media 414 may further include a communication component 420. The communication component 420 may be enable communication of audio data over various networks by the voice-enabled device 110. For instance, the communication component 420 may include logic, such as protocols, for communication over any type of network (e.g., PANs, WANs, LANs, etc.), and using various protocols or standards (Bluetooth, WiFi, ZigBee, etc.). To further enable the voice-enabled device 110 to communicate using various types of protocols or standards, the voice-enabled device 110 may further include one or more encoder/decoder components.

The computer-readable media 414 may further include a wake word detection component 422 to detect a wakeword by performing wakeword detection on the audio data within which voice activity has been detected or on a directional audio signal within which the highest level of voice activity has been detected. As mentioned above, a predefined word, expression, or other sound can be used as a signal that the user 106 intends subsequent speech to be received and acted upon by the voice-enabled device 110. In some examples, the wakeword detection may be implemented using keyword spotting technology. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In some cases, a keyword spotter may use simplified ASR (automatic speech recognition) techniques. For example, the wake word detection component 416 may use a Hidden Markov Model (HMM) recognizer that performs acoustic modeling of an audio signals and compares the HMM model to one or more reference HMM models that have been created by training for a specific trigger expression. An HMM model represents a word as a series of states. Generally, a portion of an audio signal is analyzed by comparing its HMM model to an HMM model of the trigger expression, yielding a feature score that represents the similarity of the audio signal model to the trigger expression model. In practice, an HMM recognizer may produce multiple feature scores, corresponding to different features of the HMM models.

The wakeword detection may also use a support vector machine (SVM) classifier that receives the one or more feature scores produced by the HMM recognizer. The SVM classifier produces a confidence score indicating the likelihood that an audio signal contains the trigger expression. As described above, the voice-enabled device 106 may begin storing and/or streaming audio data upon detecting a pre-defined wake word. The computer-readable media 414 may further store a voice services component 424 and a hybrid request selector 426, each of which include various other components that are described in more detail in FIG. 4B.

The computer-readable media 414 may further store the local speech-processing component 112, which may include an ASR component 428 and an NLU component 430. In some instances, audio data representing an utterance 108 may be streamed to the ASR component 428, which detects an endpoint of the utterance 108 and determines to close the stream of the audio data. In some instances, the ASR component 428 of the local speech-processing component 112 may process the audio data to determine textual data which corresponds to the utterance 108. In some examples, the ASR component 428 may generate ASR confidence scores representing the likelihood that a particular set of words of the textual data matches those spoken in the utterance 108. For instance, the ASR component 428 may determine a confidence or likelihood that a particular word which matches the sounds would be included in the sentence at the specified location (e.g., using a language or grammar model). Thus, each potential textual interpretation of the voice command 110 (hypothesis) is associated with an ASR confidence score. The ASR component 428 may then return the textual data to the NLU component 430.

In various examples, the textual data corresponding to the utterance 108 may be sent to the NLU component 430 to be analyzed or processed by the NLU component 430 to determine an intent expressed by the user 106 in the utterance 108. For example, if the user 106 issued a command to "please turn on my windshield wipers," the NLU component 430 may determine that the user's intent is to have the voice-enabled device 110 send a directive or comment to the vehicle 104 to turn on windshield wipers of the vehicle.

The output data from the NLU processing (which may include tagged text, commands, etc.) may then be sent to a skill component 432 comprising one or more skills 434. The destination skill 434 may be determined based on the NLU output. For example, if the NLU output includes a command to send a message, the destination skill 434 may be a message sending application configured to execute a message sending command. If the NLU output includes a search request, the destination skill 434 may include a search engine processor, such as one located on a search server, configured to execute a search command. As a further example, if the intent does not match to a skill, the intent may be mapped to the fallback skill 434 which generates a command for the voice-enabled device 110 to use the remote system 120 to process the audio data and determine response data for the utterance 108.

The computer-readable media 414 may include or store a fallback-handler component 438 which performs the activities around using the remote system 120 to obtain the response data. Further, the computer-readable media 414 may store a text-to-speech (TTS) component 440. The TTS component 440 then generates an actual audio file for outputting audio data determined by a skill 434 (e.g., "we have started your windshield wipers", or "we have opened your sunroof . . . ").

FIG. 4B illustrates a block diagram of an example architecture of a voice-enabled device 110 and depicts additional components and functionality for the device 110.

As illustrated, audio data 442 representing this user's utterance 108 is ultimately received by a wakeword engine 422 of a voice services component 424 executing on the voice-enabled device 110. The wakeword engine 422 may be configured to compare the audio data 442 to stored models used to detect a wakeword (e.g., "Alexa") that indicates to the voice-enabled device 110 that the audio data 443 is to be processed for determining an intent (a local NLU result). Thus, the wakeword engine 422 is configured to determine whether a wakeword is detected in the audio data 442, and, if a wakeword is detected, the wakeword engine 422 can proceed with routing the audio data 442 to an audio front end (AFE) 44 of the voice services component 424. If a wakeword is not detected in the audio data 442, the wakeword engine 422 can refrain from sending the audio data 442 to the AFE 446, thereby preventing the audio data 443 from being further processed. The audio data 443 can be discarded in this situation.

In some embodiments, the wakeword engine 422 may include an acoustic event detector (AED) 444. The AED 44 may be configured to compare the audio data 442 to stored models used to detect an acoustic or audio event that indicates to the voice-enabled device 110 that the audio data 442 is to be processed for determining an intent for the detected audio event. As mentioned above, an example of an audio event might be the sound of a hand clap, the sound of breaking glass, the sound of a baby crying, or the like, that is detected in the audio data 442. In other words, the AED 444 is configured to detect non-speech events in the audio data 442.

The AFE 445 (sometimes referred to as acoustic front end (AFE) 445) of a voice services component 424 executing on the voice-enabled device 110. The AFE 445 is configured to transform the audio data 442 from the wakeword engine 422 into data for processing by the ASR component 428 and/or the NLU component 430. The AFE 445 may reduce noise in the audio data 442 and divide the digitized audio data 442 into frames representing a time intervals for which the AFE 445 determines a number of values, called features, representing the qualities of the audio data 442, along with a set of those values, called a feature vector, representing the features/qualities of the audio data 442 within the frame. Many different features may be determined, and each feature represents some quality of the audio data 442 that may be useful for ASR processing and/or NLU processing. A number of approaches may be used by the AFE 445 to process the audio data 442, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 445 is configured to use beamforming data to process the received audio data 442. Beamforming can be used to distinguish between the directions from which speech and noise originate. Accordingly, the microphones 406 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 442, used by the AFE 445 in beamforming, may be determined based on results of the wakeword engine's 422 processing of the audio data 442. For example, the wakeword engine 422 may detect the wakeword in the audio data 442 from a first microphone 406 at time, t, while detecting the wakeword in the audio data 442 from a second microphone 406 a millisecond later in time (e.g., time, t+1 millisecond), and so on and so forth, for any suitable number of audio signals corresponding to multiple microphones 406 in a microphone array.

A speech interaction manager (SIM) 446 of the voice services component 424 may receive the audio data 442 that has been processed by the AFE 445. The SIM 446 may manage received audio data 442 by processing utterances and non-speech noise or sounds as events, and the SIM 446 may also manage the processing of directives that are used to respond to the user speech or non-speech noise or sounds (e.g., by controlling the action(s) of the voice-enabled device 110). The SIM 446 may include one or more client applications 448 for performing various functions at the voice-enabled device 110.

A hybrid request selector 426 (or, hybrid request selector component 426) of the voice-enabled device 110 is shown as including a hybrid proxy (HP) 450 (or, hybrid proxy (HP) subcomponent 450), among other subcomponents. The HP 450 can be implemented as a layer within the voice services component 424 that is located between the SIM 446 and a speech communication library (SCL) 452, and may be configured to proxy traffic to/from the remote system 120. For example, the HP 450 may be configured to pass messages between the SIM 446 and the SCL 452 (such as by passing events and directives there between), and to send messages to/from a hybrid execution controller (HEC) 126 (or, hybrid execution controller (HEC) subcomponent 454) of the hybrid request selector 426. For instance, directive data received from the remote system 120 can be sent to the HEC 454 using the HP 450, which sits in the path between the SCL 452 and the SIM 446. The HP 450 may also be configured to allow audio data 442 received from the SIM 446 to pass through to the remote system 120 (e.g., to the remote speech processing system 120) (via the SCL 452) while also receiving (e.g., intercepting) this audio data 442 and sending the received audio data to the HEC 454 (sometimes via an additional SCL).

A local speech processing component 112 (sometimes referred to as a "speech processing component" 122, or a "spoken language understanding (SLU) component" 122) is configured to process audio data 442 (e.g., audio data 442 representing user speech, audio data 442 representing non-speech noise or sounds, etc.). In some embodiments, the hybrid request selector 426 may further include a local request orchestrator (LRO) 456 (or, local request orchestrator (LRO) subcomponent 456) of the hybrid request selector 426. The LRO 456 is configured to notify the local speech processing component 112, about the availability of new audio data 442 that represents user speech, and to otherwise initiate the operations of the local speech processing component 112 when new audio data 442 becomes available. In general, the hybrid request selector 426 may control the execution of the local speech processing component 112, such as by sending "execute" and "terminate" events/instructions to the local speech processing component 112. An "execute" event may instruct the local speech processing component 112 to continue any suspended execution based on audio data 442 (e.g., by instructing the local speech processing component 112 to execute on a previously-determined intent in order to generate a directive). Meanwhile, a "terminate" event may instruct the local speech processing component 112 to terminate further execution based on the audio data 442, such as when the voice-enabled device 110 receives directive data from the remote system 120 and chooses to use that remotely-generated directive data. The LRO 456 may also notify (or otherwise interact with) other local components, such as to notify those components about the availability of new audio data 442 and/or a new interaction that has started. For example, the LRO 456 may notify an interaction log manager (ILM) component 458 that an interaction between a user and the voice-enabled device 110 has started, and/or that new audio data 442 is otherwise available. The LRO 456 may send events to the ILM component 458 for this purpose, whenever an utterance is captured and new audio data 442 becomes available. The LRO 456 may also interact with a skills execution component 432 configured to receive intent data output from the local speech processing component 112 and to execute a skill based on the intent.

In the example of FIG. 1, where the user 106 utters the expression "Please adjust route," the audio data 442 is received by the wakeword engine 422, which detects the wakeword "please," and forwards the audio data 442 to the SIM 446 as a result. The SIM 446 may send the audio data 442 through the HP 450, and the HP 450 may allow the audio data 442 to pass through to the remote system 120 (e.g., via the SCL 452), and the HP 450 may also input the audio data 442 to the local speech processing component 112 by routing the audio data 442 through the HEC 454 of the hybrid request selector 426, whereby the LRO 456 notifies the local speech processing component 112 and/or the ILM component 458 of the incoming audio data 442. At this point, the hybrid request selector 426 may wait for response data from the remote system 120 and/or the local speech processing component 112.

The local speech processing component 112 is configured to receive the audio data 442 from the hybrid request selector 426 as input, to recognize speech and/or non-speech audio events in the audio data 442, to determine an intent (e.g., user intent) from the recognized speech or non-speech audio event. This intent can be provided to the skills execution component 432 via the LRO 456, and the skills execution component 432 can determine how to act on the intent by generating directive data. In some cases, a directive may include a description of the intent (e.g., an intent to turn off {device A}). In some cases, a directive may include (e.g., encode) an identifier of a higher-latency device(s), such as the kitchen lights, and an operation to be performed at the higher-latency device. Directive data that is generated by the skills execution component 432 (and/or the remote speech processing system 120) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the wide area network 118. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

Figure 5:
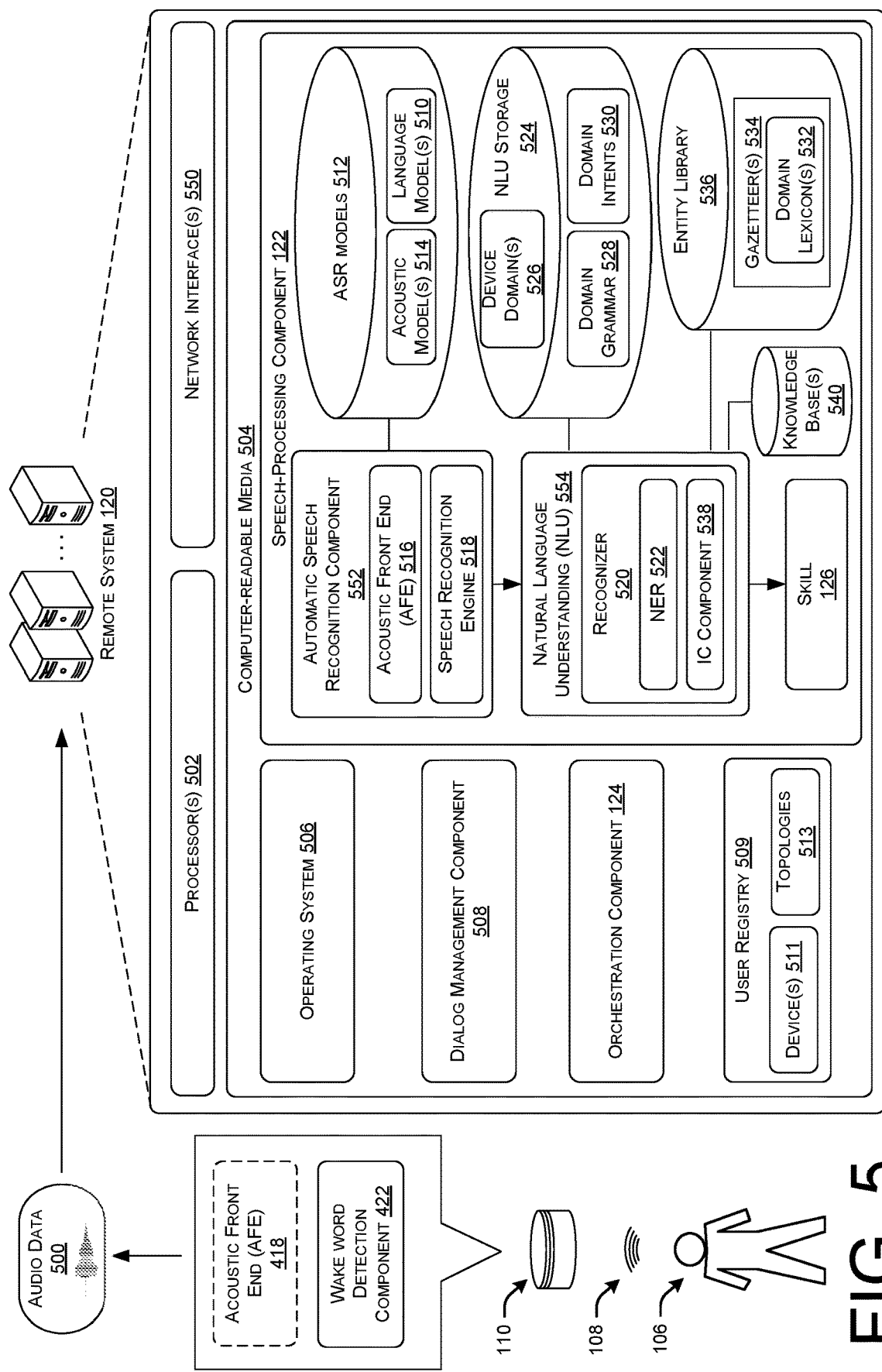
FIG. 5 illustrates a block diagram of an example architecture of a remote system which receives audio data from a voice-enabled device, and performs speech automatic speech recognition (ASR) and/or natural language understanding (NLU) techniques to determine an intent of the utterance. Further, the remote system includes a skill configured to generate a command and/or additional content that is responsive to an intent of the utterance.

FIG. 5 illustrates a block diagram of an example architecture of a remote system which receives audio data from a voice-enabled device, and performs speech automatic speech recognition (ASR) and/or natural language understanding (NLU) techniques to determine an intent of the utterance. Further, the remote system includes a skill configured to generate a command and/or additional content that is responsive to an intent of the utterance. FIG. 5 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 120). The various components illustrated may be located on a same device or different physical devices. Message between various components illustrated in FIG. 5 may occur directly or across a network 118. An audio capture component, such as a microphone 406 of the device 110, or another device, captures an utterance 108 corresponding to a spoken utterance. The device 110, using a wake word engine 422, then processes audio data corresponding to the utterance 108 to determine if a keyword (such as a wakeword) is detected in the audio data. Following detection of a wakeword, the device 110 sends audio data 500 corresponding to the utterance to the remote system 120 that includes an ASR component 552. The audio data 500 may be output from an optional acoustic front end (AFE) 445 located on the device prior to transmission. In other instances, the audio data 500 may be in a different form for processing by a remote AFE 445, such as the AFE 445 located with the ASR component 552 of the remote system 120.

The wake word engine 422 works in conjunction with other components of the user device, for example a microphone to detect keywords in the utterance 108. For example, the device may convert the utterance 108 into audio data, and process the audio data with the wake word engine 422 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake word detection component 422 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word detection component 422 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wake words with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the lower-latency device 110 may "wake" and begin transmitting audio data 500 corresponding to input the utterance 108 to the remote system 120 for speech processing. Audio data corresponding to that audio may be sent to remote system 120 for routing to a recipient device or may be sent to the remote system 120 for speech processing for interpretation of the included speech (either for purposes of enabling voice-messages and/or for purposes of executing a command in the speech). The audio data 500 may include data corresponding to the wakeword, or the portion of the audio data corresponding to the wakeword may be removed by the lower-latency device 110 prior to sending. Further, a lower-latency device may "wake" upon detection of speech/spoken audio above a threshold, as described herein. Upon receipt by the remote system 120, an ASR component 552 may convert the audio data 500 into text. The ASR transcribes audio data into text data representing the words of the speech contained in the audio data 500. The text data may then be used by other components for various purposes, such as executing system commands, inputting data, etc. A spoken utterance in the audio data is input to a processor configured to perform ASR which then interprets the utterance based on the similarity between the utterance and pre-established language models 510 stored in an ASR model knowledge base (ASR Models Storage 512). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 514 stored in an ASR Models Storage 512), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 552 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 445 and a speech recognition engine 518. The acoustic front end (AFE) 445 transforms the audio data from the microphone into data for processing by the speech recognition engine 518. The speech recognition engine 518 compares the speech recognition data with acoustic models 514, language models 510, and other data models and information for recognizing the speech conveyed in the audio data. The AFE 445 may reduce noise in the audio data and divide the digitized audio data into frames representing time intervals for which the AFE 445 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 518 may process the output from the AFE 445 with reference to information stored in speech/model storage (512). Alternatively, post front-end processed data (such as feature vectors) may be received by the device executing ASR processing from another source besides the internal AFE. For example, the user device may process audio data into feature vectors (for example using an on-device AFE 445) and transmit that information to a server across a network for ASR processing. Feature vectors may arrive at the remote system 120 encoded, in which case they may be decoded prior to processing by the processor executing the speech recognition engine 518.

The speech recognition engine 518 attempts to match received feature vectors to language phonemes and words as known in the stored acoustic models 514 and language models 510. The speech recognition engine 518 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, please adjust route." The wake detection component may identify the wake word, otherwise described as a trigger expression, "Alexa," in the user utterance and may "wake" based on identifying the wake word. Audio data corresponding to the user utterance may be sent to the remote system 120, where the speech recognition engine 518 may identify, determine, and/or generate text data corresponding to the user utterance, here "adjust route."

The speech recognition engine 518 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 518 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 120, for natural language understanding (NLU) processing, such as conversion of the text into commands for execution, either by the user device, by the remote system 120, or by another device (such as a server running a specific application like a search engine, etc.).

The device performing NLU processing 554 (e.g., server) may include various components, including potentially dedicated processor(s), memory, storage, etc. As shown in FIG. 5, an NLU component 554 may include a recognizer 530 that includes a named entity recognition (NER) component 532 which is used to identify portions of query text that correspond to a named entity that may be recognizable by the system. A downstream process called named entity resolution links a text portion to a specific entity known to the system. To perform named entity resolution, the system may utilize gazetteer information stored in entity library storage 536. The gazetteer information may be used for entity resolution, for example matching ASR results with different entities (such as voice interface devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 552 based on the utterance input audio) and attempts to make a semantic interpretation of the text. That is, the NLU process determines the meaning behind the text based on the individual words and then implements that meaning. NLU processing 554 interprets a text string to derive an intent or a desired action from the user as well as the pertinent pieces of information in the text that allow a device (e.g., device 110) to complete that action. For example, if a spoken utterance is processed using ASR 552 and outputs the text "play notifications" the NLU process may determine that the user intended to have notifications output by one or more devices.

The NLU 554 may process several textual inputs related to the same utterance. For example, if the ASR 552 outputs N text segments (as part of an N-best list), the NLU may process all N outputs to obtain NLU results.

As will be discussed further below, the NLU process may be configured to parse and tag to annotate text as part of NLU processing. For example, for the text "play notifications," "play" may be tagged as a command (to output images and/or audio) and "notifications" may be tagged as the category of the content to be output.

To correctly perform NLU processing of speech input, an NLU process 554 may be configured to determine a "domain" of the utterance so as to determine and narrow down which services offered by the endpoint device (e.g., remote system 120 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 532 receives a query in the form of ASR results and attempts to identify relevant grammars and lexical information that may be used to construe meaning. To do so, the NLU component 554 may begin by identifying potential domains that may relate to the received query. The NLU storage 534 includes a database of devices (536a-536n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 530, language model and/or grammar database, a particular set of intents/actions, and a particular personalized lexicon 532. Each gazetteer may include domain-indexed lexical information associated with a particular user and/or device. For example, the Gazetteer 534 includes domain-index lexical information 532. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 538 parses the query to determine an intent or intents for each identified domain, where the intent corresponds to the action to be performed that is responsive to the query. Each domain is associated with a database of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 538 identifies potential intents for each identified domain by comparing words in the query to the words and phrases in the intents database 530. In some instances, the determination of an intent by the IC component 538 is performed using a set of rules or templates that are processed against the incoming text to identify a matching intent.

In order to generate a particular interpreted response, the NER 532 applies the grammar models and lexical information associated with the respective domain to actually recognize a mention of one or more entities in the text of the query. In this manner, the NER 532 identifies "slots" or values (i.e., particular words in query text) that may be needed for later command processing. Depending on the complexity of the NER 532, it may also label each slot with a type of varying levels of specificity (such as noun, place, device name, device location, city, artist name, song name, amount of time, timer number, or the like). Each grammar model 538 includes the names of entities (i.e., nouns) commonly found in speech about the particular domain (i.e., generic terms), whereas the lexical information 532 from the gazetteer 534 is personalized to the user(s) and/or the device. For instance, a grammar model associated with the shopping domain may include a database of words commonly used when people discuss shopping.

The intents identified by the IC component 538 are linked to domain-specific grammar frameworks (included in 538) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (538) framework or frameworks may correspond to sentence structures such as "purchase item called 'Item A' from Marketplace A."

For example, the NER component 532 may parse the query to identify words as subject, object, verb, preposition, etc., based on grammar rules and/or models, prior to recognizing named entities. The identified verb may be used by the IC component 538 to identify intent, which is then used by the NER component 532 to identify frameworks. A framework for the intent of "play a song," meanwhile, may specify a list of slots/fields applicable to play the identified "song" and any object modifier (e.g., specifying a music collection from which the song should be accessed) or the like. The NER component 532 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 532 may search the database of generic words associated with the domain (in the knowledge base 540). So, for instance, if the query was "identify this song," after failing to determine which song is currently being output, the NER component 532 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a skill 126. The destination skill 126 may be determined based on the NLU output. For example, if the NLU output includes a command to send a message, the destination skill 126 may be a message sending application, such as one located on the user device or in a message sending appliance, configured to execute a message sending command. If the NLU output includes a search request, the destination application 126 may include a search engine processor, such as one located on a search server, configured to execute a search command. After the appropriate command is generated based on the intent of the user, the skill 126 may provide some or all of this information to a text-to-speech (TTS) engine. The TTS engine may then generate an actual audio file for outputting the audio data determined by the skill 126 (e.g., "okay," or "playing notifications"). After generating the file (or "audio data"), the TTS engine may provide this data back to the remote system 120.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 554 during runtime operations where NLU operations are performed on text (such as text output from an ASR component 552). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 530. Each recognizer may include various NLU components such as an NER component 532, IC component 538 and other components such as an entity resolver, or other components.

For example, a messaging domain recognizer 530 may have an NER component 532 that identifies what slots (i.e., portions of input text) may correspond to particular words relevant to that domain. The words may correspond to entities such as (for the messaging domain) a recipient. An NER component 532 may use a machine learning model, such as a domain specific conditional random field (CRF) to both identify the portions corresponding to an entity as well as identify what type of entity corresponds to the text portion. The messaging domain recognizer 530 may also have its own intent classification (IC) component 538 that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 110 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 120, as illustrated herein are exemplary, and may be located in a stand-alone device or may be included, in whole or in part, as a component of a larger device or system, may be distributed across a network or multiple devices connected by a network, etc.

As used herein, a processor, such as processor(s) 402 and 502, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 402 and 502 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 402 and 502 may possess its own local memory, which also may store program components, program data, and/or one or more operating systems.

As described herein, computer-readable media 414 and/or 510 may include volatile and nonvolatile memory, removable and non-removable media implemented in any method or technology for storage of information, such as computer-readable instructions, data structures, program component, or other data. Such computer-readable media 414 and/or 510 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 402 and/or 502 to execute instructions stored on the computer-readable media 414 and/or 510. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable 414 and/or 510, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Figure 6A:
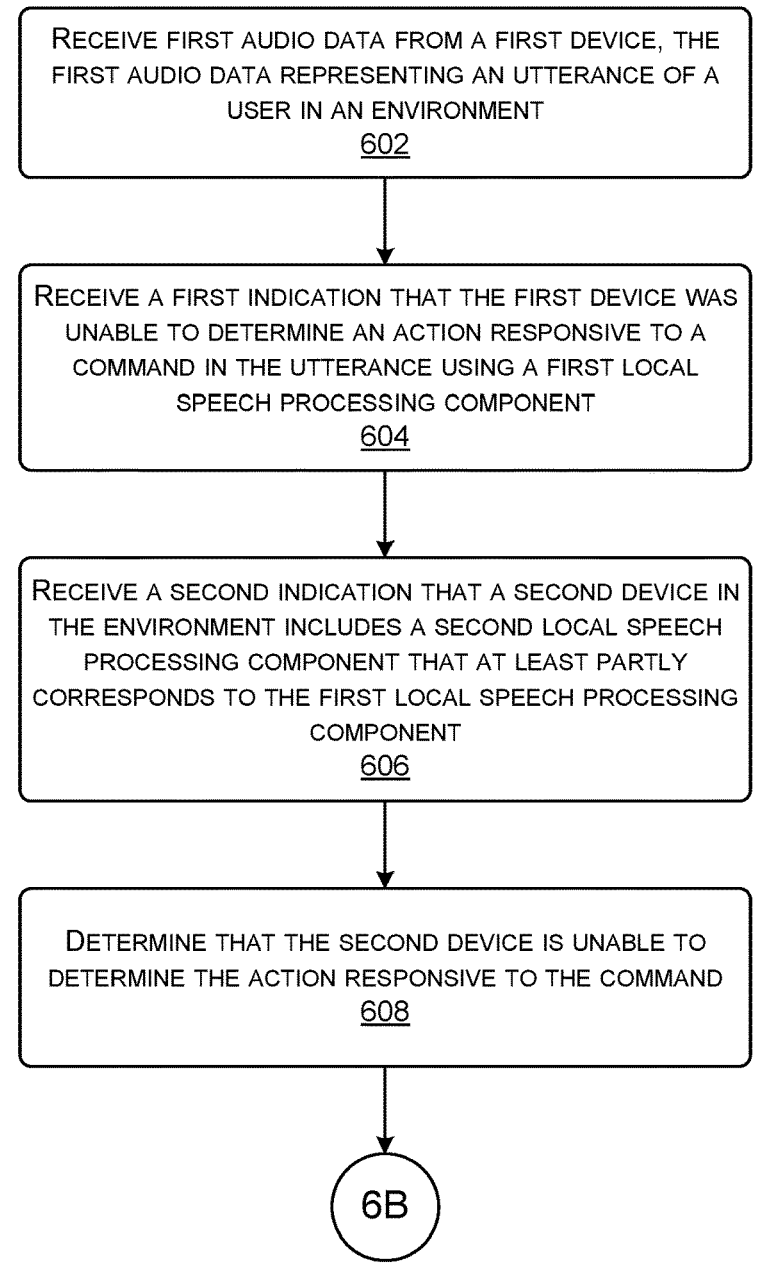
FIGS. 6A and 6B collectively illustrate a flow diagram of an example method for a remote system to determine that a first voice-enabled device is unable to process an utterance locally, predict that a second voice-enabled device is also unable to process the utterance locally, and send response data to the second voice-enabled device that indicates a response to the utterance.
Figure 6B:
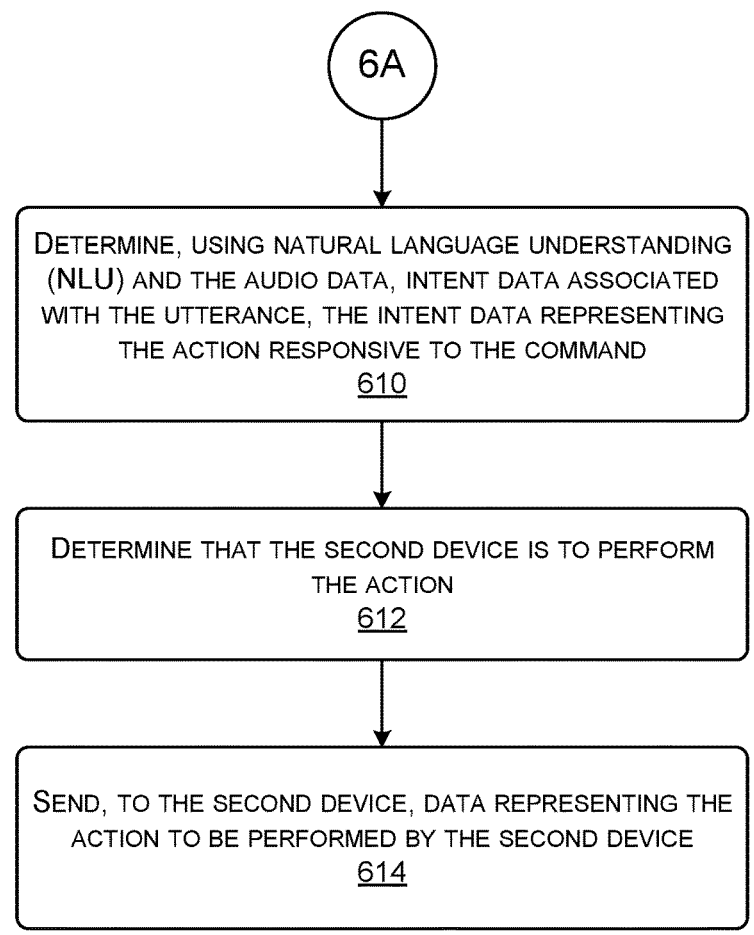
Figure 7:
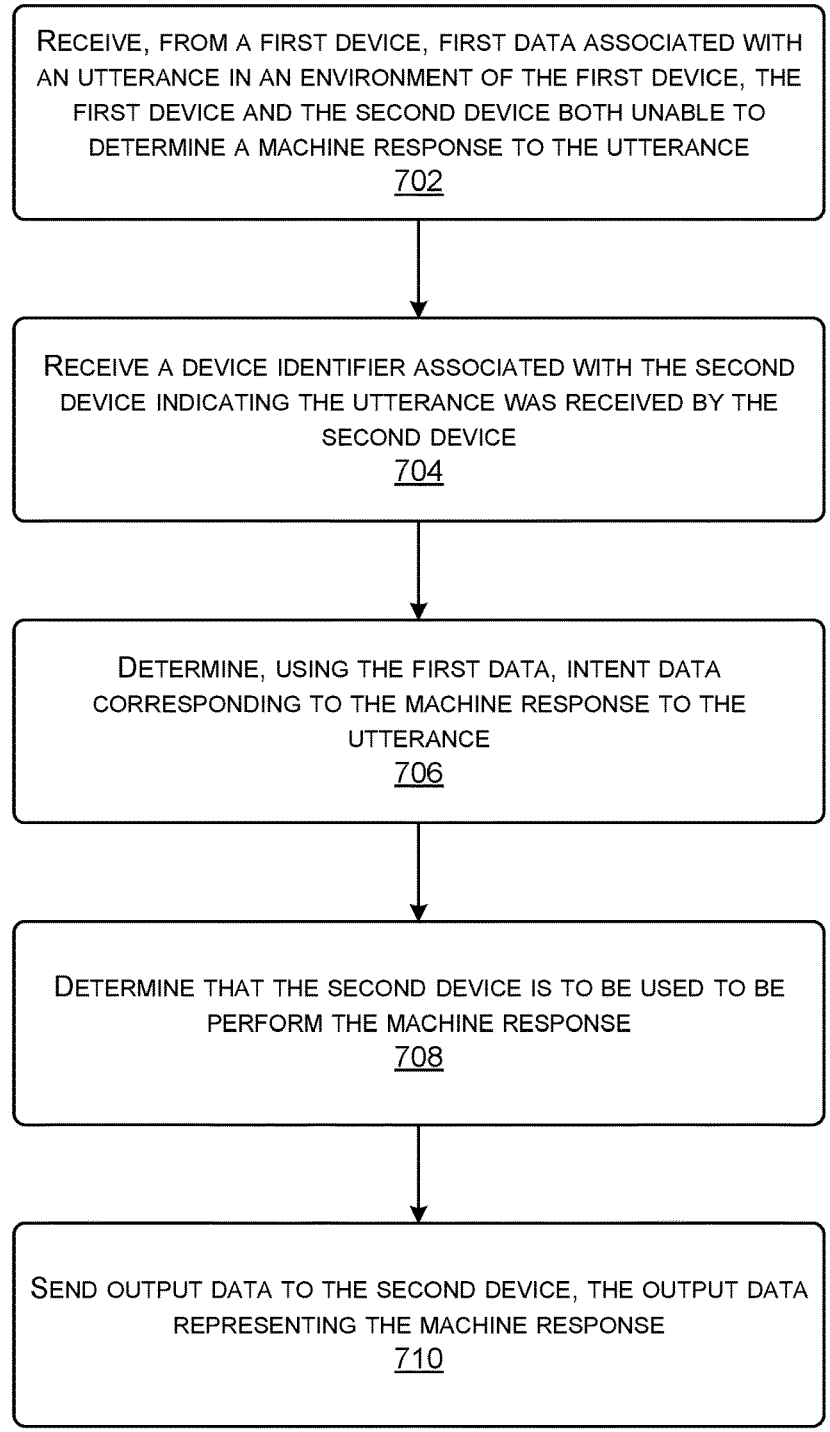
FIG. 7 illustrates another flow diagram of an example method for a remote system to determine that a first voice-enabled device is unable to process an utterance locally, predict that a second voice-enabled device is also unable to process the utterance locally, and send response data to the second voice-enabled device that indicates a response to the utterance.

FIGS. 6A, 6B, and 7 illustrate flow diagrams of example methods 600 and 700 that illustrate aspects of the functions performed at least partly by the devices described in FIGS. 1-6. The logical operations described herein with respect to FIGS. 6A, 6B, and 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6A, 6B, and 7, and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

In some instances, the steps of methods 600 and/or 700 may be performed by a device and/or a system of devices that includes one or more processors and one or more non-transitory computer-readable media storing computer-executable instructions that, when executed by the one or more processors, cause the one or more processors to perform operations of methods 600 and/or 700.

FIGS. 6A and 6B collectively illustrate a flow diagram of an example method 600 for a remote system 120 to determine that a first voice-enabled device 110A is unable to process an utterance locally, predict that a second voice-enabled device 110B is also unable to process the utterance locally, and send response data to the second voice-enabled device 110B that indicates a response to the utterance.

At 602, the remote system 120 may receive first audio data from a first device where the first audio data represents an utterance of a user in an environment. For instance, the lower-latency device 110A may user a microphone to capture the utterance 108 from the user 106, generate audio data representing the utterance 108, and send the audio data to the remote system 120.

At 604, the remote system 120 may receive a first indication that the first device was unable to determine an action responsive to a command in the utterance using a first local speech processing component. In some instances, the remote system 120 may receive an explicit message or indication notifying the remote system 120 that the lower-latency device 110A was unable to determine the action responsive to the command in the utterance 108, and in other examples, the remote 120 system may infer that the lower-latency device 110A was unable to determine the action locally because the lower-latency device 110A sent the audio data to the remote system 120. In some instances, the second device 110B may send audio data to the remote speech-processing system 120 with higher latency than the first device 110A sends audio data to the remote system. In some instances, the second device 110B may be unable to establish a connection with the remote system 120. The second device 110B may be configured to send audio data generated by the second device 110B to the first device 110A for speech processing on behalf of the second device 110B.

At 606, the remote system 120 may receive a second indication that a second device in the environment includes a second local speech processing component that at least partly corresponds to the first local speech processing component. For instance, one or both of the devices 110A and 110B may have sent indications of their location and/or their proximity to each other. Further, the remote system 120 may have received input, from an administrator, the user 106, and or the devices 110A or 110B, regarding the capabilities of the devices 110A and 110B. Thus, the remote system 120 may determine that the local speech-processing components 112A and 112B are at least partially corresponding (e.g., same version or similar version, missing and/or having a same skill, etc.).

At 608, the remote system 120 may determine that the second device is unable to determine the action responsive to the command in response to determining that the second local speech processing component at least partly corresponding to the first local speech processing component. For instance, because the remote system 120 knows that the lower-latency device 110A is unable to process the utterance 108 locally using the local speech-processing component 112A, and that the local speech-processing component 112A at least partly corresponds to the local speech-processing component 112B, the remote system 120 may infer that the higher-latency device 110B is also unable to determine the action responsive to the command in the utterance 108. For instance, each of the local speech-processing components 112A and 112B may be missing the skill necessary to determine the action that is responsive to the utterance 108.

At 610, the remote system 120 may determine, using natural language understanding (NLU) and the audio data, intent data associated with the utterance, the intent data representing the action responsive to the command.

At 612, the remote system 120 may determining that the second device is to perform the action. For instance, the remote system 120 may have received first data indicating that a first role of the first lower-latency device 110A is to send audio data representing utterances 108 on behalf of the higher-latency device 110B, and received second data indicating that a second role of the higher-latency device 110B is to perform actions responsive to the utterances 108.

At 614, the remote system 120 may send, to the second device, data representing the action to be performed by the second device. For instance, the remote system 120 may send response data to the higher-latency device 110B.

In some instances, the method 600 may further include receiving, at the remote system 120, a second indication that a second utterance 108 was received by the second device 110B. For instance, the second device 110B may have detected a second utterance 108 after performing the machine response to the first utterance 108. The remote system 120 may then determine that the first device was able to perform speech processing to determine a second machine response to the second utterance 108. The remote system 120 may then determine to update the second device 110B. The remote system 120 may send, to the second device 110B, second data including an update for a local speech-processing component of the second device 110B. The update may configure the local speech-processing component to perform speech processing on the second utterance 108 to determine the second machine response. That is, the remote system 120 may update the second device 110B such that the second device 108B be able to process the second utterance 108 to determine (and potentially perform) the second machine response the next time a user 106 says the second utterance 108.

FIG. 7 illustrates another flow diagram of an example method 700 for a remote system 120 to determine that a first voice-enabled device is unable to process an utterance locally, predict that a second voice-enabled device is also unable to process the utterance locally, and send response data to the second voice-enabled device that indicates a response to the utterance.

At 702, the remote system 120 may receive, from a first device, first data associated with an utterance in an environment of the first device. For instance, the lower-latency device 110A may use a microphone to capture the utterance 108 from the user 106, generate audio data and/or text data representing the utterance 108, and send the audio data and/or text data to the remote system 120. In such examples, the first device and a second device in the environment may both be unable to determine a machine response (e.g., command data 128) to the utterance 108.

At 704, the remote system 120 may receive a device identifier associated with the second device indicating the utterance was received by the second device. For instance, the first device 110A may provide a device identifier for the second device 110B indicating that the second device 110B received the utterance 108. In some examples, the second device 110B may have requested that the first device 110A process the utterance 108 because the first device 110A has additional, or more robust, processing resources for processing utterances 108 (e.g., additional or more complex software and/or hardware components).

In some instances, the remote system 120 may determine that the first device was unable to determine a machine response to the utterance. In some instances, the remote system 120 may receive an explicit message or indication notifying the remote system 120 that the lower-latency device 110A was unable to determine the action responsive to the command in the utterance 108, and in other examples, the remote 120 system may infer that the lower-latency device 110A was unable to determine the action locally because the lower-latency device 110A sent the audio data to the remote system 120. Further, the remote system 120 may determine that a second device in the environment is unable to determine the machine response at least partly in response to the first device being unable to determine the machine response. For instance, because the remote system 120 knows that the lower-latency device 110A is unable to process the utterance 108 locally using the local speech-processing component 112A, and that the local speech-processing component 112A at least partly corresponds to the local speech-processing component 112B, the remote system 120 may infer that the higher-latency device 110B is also unable to determine the action responsive to the command in the utterance 108. For instance, each of the local speech-processing components 112A and 112B may be missing the skill necessary to determine the action that is responsive to the utterance 108.

At 706, the remote system 120 may determine, using the first data, intent data corresponding to the machine response to the utterance. At 708, the remote system 120 may determine that the second device is to be used to be perform the machine response. For instance, the remote system 120 may have received first data indicating that a first role of the first lower-latency device 110A is to send audio data representing utterances 108 on behalf of the higher-latency device 110B, and received second data indicating that a second role of the higher-latency device 110B is to perform actions responsive to the utterances 108. At 710, the remote system 120 may send output data to the second device, where the output data represents the machine response.

Additionally, or alternatively, the method 700 may further comprise receiving, from the second device, second data associated with the utterance using a second communication protocol associated with a second latency, the second latency being greater than the first latency.

Additionally, or alternatively, the method 700 may further comprise receiving second data indicating that a role of the second device is to perform machine responses to utterances, and sending third data representing the machine response to the second device to be performed by the second device.

Additionally, or alternatively, the method 700 may further comprise determining that the first device includes a first natural language understanding (NLU) component, determining that the second device includes a second NLU component that at least partly corresponds to the first NLU component, wherein determining that the second device is unable to determine the machine response is further performed at least partly responsive to determining that the second NLU component at least partly corresponds to the first NLU component.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, from a first device, first data associated with an utterance in an environment of a second device, the first device and the second device both unable to determine a machine response to the utterance;
   receiving a device identifier associated with the second device indicating the utterance was received by the second device;
   determining, using the first data, intent data corresponding to the machine response to the utterance;
   determining that the second device is to be used to be perform the machine response; and
   sending output data to the second device, the output data representing the machine response.

2. The method of claim 1, wherein receiving the first data associated with the utterance comprises receiving the first data using a first communication protocol associated with a first latency, further comprising:
   receiving, from the second device, second data associated with the utterance using a second communication protocol associated with a second latency, the second latency being greater than the first latency.

3. The method of claim 1, further comprising:
   receiving second data indicating that a role of the second device is to perform machine responses to utterances; and
   sending third data representing the machine response to the second device to be performed by the second device.

4. The method of claim 1, further comprising:
   determining that the first device includes a first natural language understanding (NLU) component;
   determining that the second device includes a second NLU component that at least partly corresponds to the first NLU component; and
   determining that the second device is unable to determine the machine response at least partly responsive to determining that the second NLU component at least partly corresponds to the first NLU component.

5. The method of claim 1, further comprising:
   determining that the second device is unable to establish a connection with a remote natural language processing (NLU) system; and sending second data representing the machine response to at least one of the first device or the second device to be performed by the second device.

6. The method of claim 1, wherein receiving the first data associated with the utterance comprises receiving the first data at a first time, further comprising:
receiving, from the second device, second data associated with the utterance at a second time that is subsequent the first time,
wherein determining the intent data is performed at a third time that is prior to the second time.

7. The method of claim 1, wherein the first data received from the first device was generated by the second device.

8. The method of claim 1, further comprising:
receiving an indication that the second device is associated with controlling operations of a vehicle,
wherein determining that the second device is to be used to perform the machine response is based at least in part on the second device being associated with controlling operations of the vehicle.

9. The method of claim 1, further comprising:
receiving second data indicating that a first role of the first device is to send data representing utterances on behalf of the second device; and
receiving third data indicating that a second role of the second device is to perform actions responsive to the utterances.

10. The method of claim 1, wherein the utterance is a first utterance, the machine response is a first machine response, and the method further comprises sending, to the second device and based at least in part on the intent data, second data that updates a local speech-processing component of the second device to perform speech processing on a second utterance to determine a second machine response.

11. The method of claim 1, wherein the first data received at the first device is generated by the second device.

12. The method of claim 1, wherein determining the intent data is performed based at least in part on the first data being received using a first predefined communication protocol associated with a first latency rather than a second predefined communication protocol associated with a second latency.

13. A system comprising:
one or more processors; and
one or more computer-readable media storing computer-executable instructions that, when executed by the one or more processors, cause the one or more processors to perform operations comprising:
receiving, from a first device, first data associated with an utterance in an environment of a second device, the first device and the second device both unable to determine a machine response to the utterance;
receiving a device identifier associated with the second device indicating the utterance was received by the second device;
determine, using the first data, intent data corresponding to the machine response to the utterance;
determining that the second device is to be used to be perform the machine response; and
sending output data to the second device, the output data representing the machine response.

14. The system of claim 13, wherein receiving the first data associated with the utterance comprises receiving the first data using a first communication protocol associated with a first latency, the operations further comprising:
receiving, from the second device, second data associated with the utterance using a second communication protocol associated with a second latency, the second latency being greater than the first latency.

15. The system of claim 13, the operations further comprising:
receiving second data indicating that a role of the second device is to perform machine responses to utterances; and
sending third data representing the machine response to the second device to be performed by the second device.

16. The system of claim 13, the operations further comprising:
determining that the first device includes a first natural language understanding (NLU) component;
determining that the second device includes a second NLU component that at least partly corresponds to the first NLU component; and
determining that the second device is unable to determine the machine response at least partly responsive to determining that the second NLU component at least partly corresponds to the first NLU component.

17. The system of claim 13, the operations further comprising:
determining that the second device is unable to establish a connection with a remote natural language processing (NLU) system; and
sending second data representing the machine response to the second device to be performed by the second device.

18. The system of claim 13, wherein receiving the first data associated with the utterance comprises receiving the first data at a first time, the operations further comprising:
receiving, from the second device, second data associated with the utterance at a second time that is subsequent the first time,
wherein determining the intent data is performed at a third time that is prior to the second time.

19. The system of claim 13, the operations further comprising:
detecting, using the first data, a predefined wake word in the utterance;
based at least in part on detecting the predefined wake word, removing, from a cache, second data representing a previous machine response for a previous utterance; and
storing third data representing the machine response to the utterance in the cache.

20. The system of claim 13, the operations further comprising:
receiving an indication that the second device is associated with controlling operations of a vehicle,
wherein determining that the second device is to be used to perform the machine response is based at least in part on the second device being associated with controlling operations of the vehicle.

* * * * *